United States Patent [19]

Hirohashi et al.

[11] Patent Number: 5,289,306
[45] Date of Patent: Feb. 22, 1994

[54] REPEATER SYSTEM

[75] Inventors: Kazutoshi Hirohashi, Yokohama; Akio Yoshikawa, Kawasaki; Takaaki Takeda, Fujisawa; Takeshi Nomoto, Yokohama; Keishi Ushijima, Nagareyama, all of Japan

[73] Assignees: Victor Company of Japan, Yokohama; NTT Data Communications Systems Corp., Tokyo, both of Japan

[21] Appl. No.: 858,292

[22] Filed: Mar. 26, 1992

[30] Foreign Application Priority Data

Mar. 27, 1991 [JP] Japan .................................. 3-087557

[51] Int. Cl.$^5$ ............................................ H04B 10/16
[52] U.S. Cl. .................................. 359/174; 359/172; 359/176
[58] Field of Search ............... 359/152, 167, 172, 174, 359/176, 175, 177

[56] References Cited

U.S. PATENT DOCUMENTS

| | | | |
|---|---|---|---|
| 4,648,131 | 3/1987 | Kawaguchi | 359/124 |
| 4,809,257 | 2/1989 | Gantenbein et al. | 359/172 |
| 4,959,874 | 9/1990 | Saruta | 359/172 |
| 4,977,619 | 12/1990 | Crimmins | 359/172 |

FOREIGN PATENT DOCUMENTS

| | | |
|---|---|---|
| 0054582 | 6/1982 | European Pat. Off. . |
| 0090839 | 5/1983 | Japan ................................... 359/119 |
| 8906459 | 7/1989 | PCT Int'l Appl. . |

OTHER PUBLICATIONS

Wu et al, "Decreasing Survivable Fiber Network Cost Using Optical Switches", IEEE Global Telecommunications Conference and Exhibition, Hollywood, Fla., Nov. 28–Dec. 1, 1988, vol. 1, pp. 3.6.1–3.6.5.

*Primary Examiner*—Leslie Pascal
*Attorney, Agent, or Firm*—Lowe, Price, LeBlanc & Becker

[57] ABSTRACT

A repeater for packet data optical communication between terminal devices includes a first section and a second section. The first section includes a first device for receiving a first optical signal transmitted from a terminal device and for converting the first optical signal into a first electric signal, a second device for frequency-converting the first electric signal to a second electric signal, and a third device for converting the second electric signal into a second optical signal and for transmitting the second optical signal. The second section includes a fourth device for receiving a third optical signal and for converting the third optical signal into a third electric signal, a fifth device for frequency-converting the third electric signal to a fourth electric signal, and a sixth device for converting the fourth electric signal into a fourth optical signal and for transmitting the fourth optical signal to a terminal device.

16 Claims, 15 Drawing Sheets

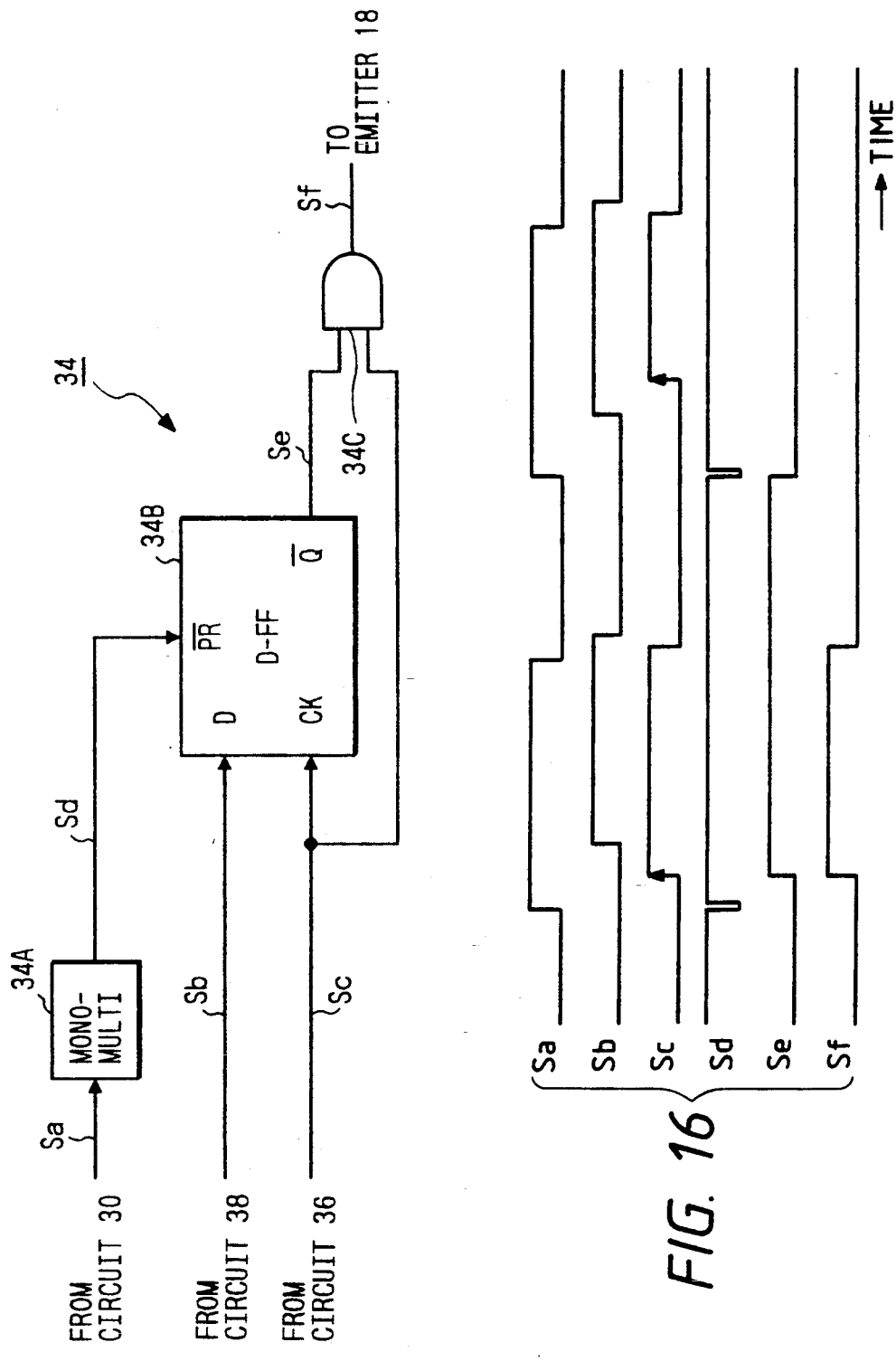

REPEATER SYSTEM

BACKGROUND OF THE INVENTION

1. Field of the Invention

This invention relates to a repeater in a data communication network using optical signals. This invention also relates to a repeater system providing an optical communication network including a repeater or repeaters.

2. Description of the Prior Art

A known optical radio communication network includes a transmitter, receivers, and repeaters. In the case where a direct optical path between the transmitter and a receiver is blocked, a repeater generally serves to maintain optical radio communication between the transmitter and the receiver. A repeater, which merely amplifies a received optical signal and then outputs a corresponding stronger optical signal, tends to oscillate since a feedback loop is easily formed between receiving and transmitting sections of the repeater. To prevent such an oscillation problem, an optical signal outputted from a transmitter is made into a time-division packet format so that optical signals inputted into and outputted from a repeater can be different from each other in contents. According to time-division packet communication, real-time transmission of information tends to be difficult.

SUMMARY OF THE INVENTION

It is an object of this invention to provide an improved repeater.

It is another object of this invention to provide an improved repeater system.

A first aspect of this invention provides a repeater for data communication between terminal devices which uses optical signals, the repeater comprising a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal; and a second section including fourth means for receiving a third optical signal and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device.

A second aspect of this invention provides a repeater system for data communication between terminal devices which uses an optical signal, the repeater system comprising repeaters each including a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal; and a second section including fourth means for receiving a third optical signal and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device.

A third aspect of this invention provides a repeater system for data communication between terminal devices which uses an optical signal, the repeater system comprising an end repeater and a host repeater, wherein the end repeater includes a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal to the host repeater; and a second section including fourth means for receiving a third optical signal from the host repeater and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device; and wherein the host repeater includes seventh means for receiving a fifth optical signal from the end repeater and for converting the fifth optical signal into a fifth electric signal, eight means for frequency-converting the fifth electric signal to a sixth electric signal, and ninth means for converting the sixth electric signal into a sixth optical signal and for transmitting the sixth optical signal to the end repeater.

A fourth aspect of this invention provides a repeater system for packet data communication between terminal devices which uses an optical signal, the repeater system comprising a host repeater and a plurality of end repeaters, wherein each of the end repeaters includes a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal to the host repeater; and a second section including fourth means for receiving a third optical signal from the host repeater and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device; and wherein the host repeater includes seventh means for receiving a fifth optical signal from the end repeater and for converting the fifth optical signal into a fifth electric signal, eighth means for frequency-converting the fifth electric signal to a sixth electric signal, and ninth means for converting the sixth electric signal into a sixth optical signal and for transmitting the sixth optical signal to the end repeater.

BRIEF DESCRIPTION OF THE DRAWINGS

FIG. 15 is a block diagram of the controller of FIG. 2.

FIG. 16 is a timing diagram showing the waveforms of various signals in the controller of FIG. 15.

DESCRIPTION OF THE FIRST PREFERRED EMBODIMENT

Figure 1:
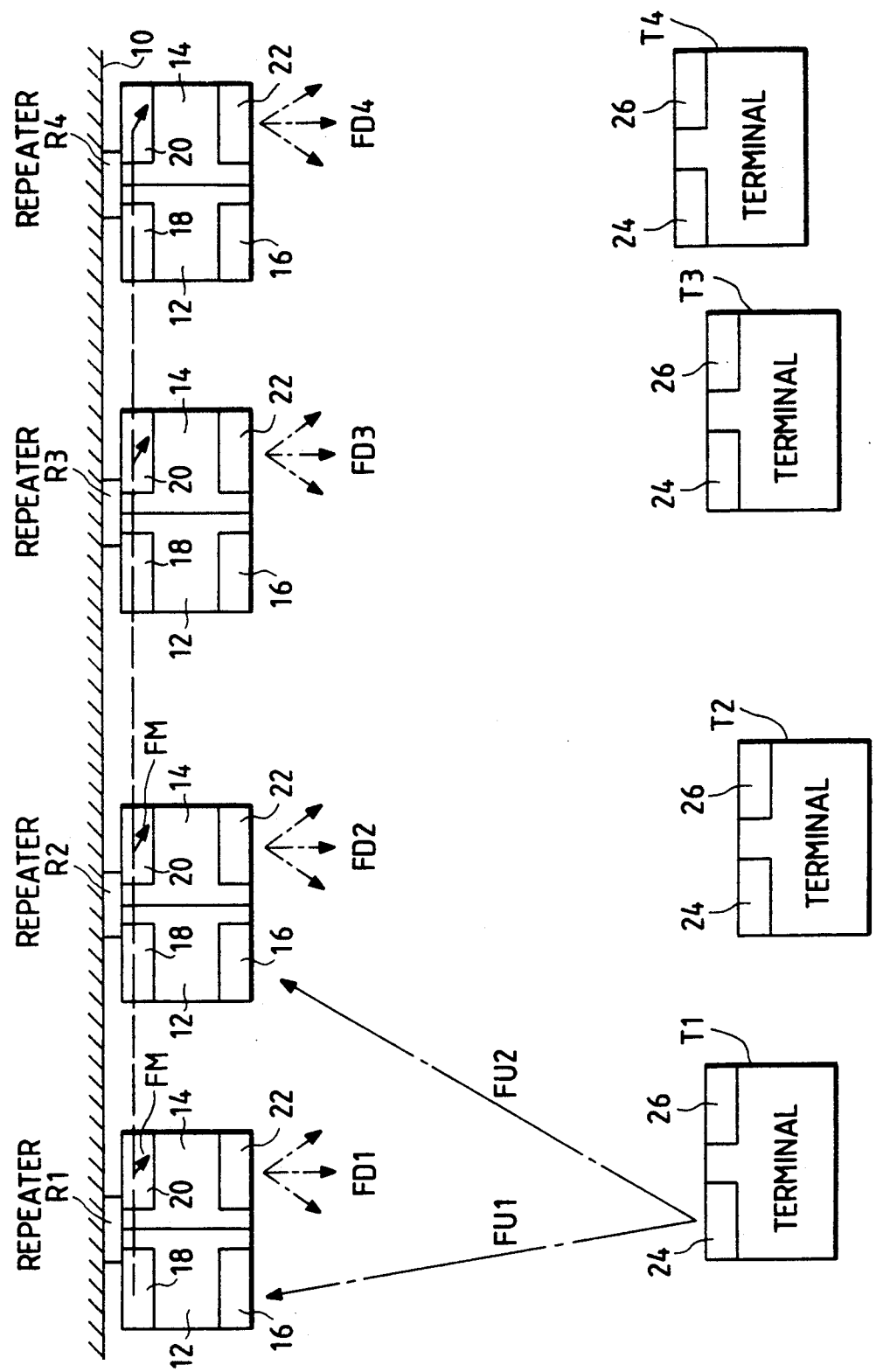
FIG. 1 is a diagram of a repeater system according to a first embodiment of this invention.

With reference to FIG. 1, similar terminal devices T1, T2, T3, T4 . . . are located on a floor. The terminal devices are also denoted by the letter T. Each terminal device T includes a light emitter 24 and a light receiver 26. Similar repeaters R1, R2, R3, R4, . . . are located at a ceiling 10. The repeaters are also denoted by the letter R. Each repeater R is divided into first and second sections 12 and 14. The first repeater section 12 includes a light receiver 16 and a light emitter 18. The second repeater section 14 includes a light receiver 20 and a light emitter 22.

Figure 2:
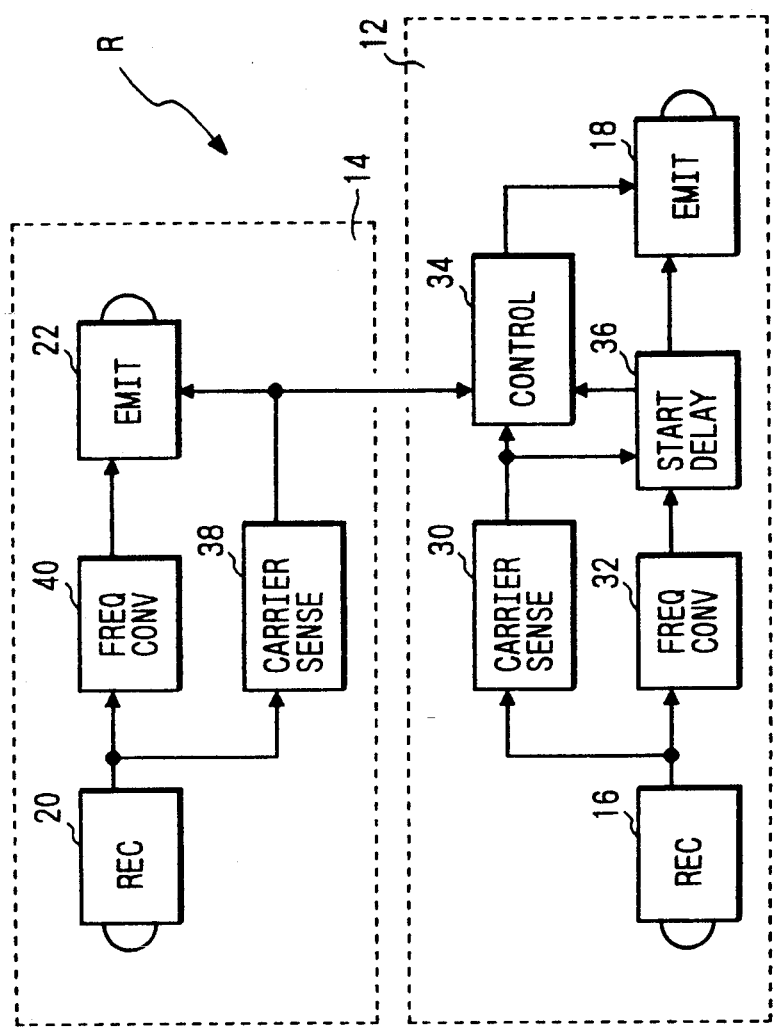
FIG. 2 is a block diagram of a repeater of FIG. 1.

As shown in FIG. 2, the first section 12 of the repeater R includes a light receiver 16, a light emitter 18, a carrier sensing circuit 30, a frequency converter 32, a controller 34, and a start delay circuit 36. The output terminal of the light receiver 16 is connected to the input terminals of the carrier sensing circuit 30 and the frequency converter 32. The output terminal of the carrier sensing circuit 30 is connected to a first input terminal of the controller 34 and a first input terminal of the start delay circuit 36. The output terminal of the frequency converter 32 is connected to a second input terminal of the start delay circuit 36. A first output terminal of the start delay circuit 36 is connected to a second input terminal of the controller 34. A second output terminal of the start delay circuit 36 is connected to the input terminal of the light emitter 18. The output terminal of the controller 34 is connected to a control terminal of the light emitter 18.

The light receiver 16 has a photosensor part, receiving an optical signal from a terminal device T and converting the optical signal into a corresponding electric signal. The light receiver 16 outputs the electric signal. The output signal of the light receiver 16 is equal to a signal which results from modulating a carrier of a predetermined frequency F1 with transmitted information (data). The transmission of information has a predetermined packet format which includes a sequence of a given-pattern preamble and subsequent data. The output signal of the light receiver 16 is fed to the carrier sensing circuit 30 and the frequency converter 32.

The carrier sensing circuit 30 includes a comparator which detects whether or not the amplitude of the output signal of the light receiver 16 is smaller than a predetermined reference level, that is, whether or not the strength of the optical signal received by the light receiver 16 is smaller than a predetermined reference strength. The carrier sensing circuit 30 outputs a signal representative of the result of the detection (the result of the comparison) to the controller 34 and the start delay circuit 36. Specifically, the output signal of the carrier sensing circuit 30 assumes a high level when the strength of the optical signal received by the light receiver 16 is equal to or greater than the predetermined reference strength. Otherwise, the output signal of the carrier sensing circuit 30 is in a low level state.

The frequency converter 32 subjects the output signal of the light receiver 16 to frequency conversion. Through the frequency conversion, the carrier frequency F1 of the output signal of the light receiver 16 is changed to a predetermined carrier frequency F2. The carrier frequency F2 is different from the carrier frequency F1. Thus, the frequency converter 32 outputs a signal having the carrier frequency F2.

The start delay circuit 36 receives the output signal of the frequency converter 32. In addition, the start delay circuit 36 receives the output signal of the carrier sensing circuit 30. The start delay circuit 36 has the function of deleting a portion of the preamble from a packet. The deleted portion of the preamble extends from the starting edge of the preamble to a point within the preamble. In addition, the length of the deleted portion is determined at random. Thus, a random-time portion of the preamble is deleted. The start delay circuit 36 outputs a sequence of the remaining preamble and subsequent data to the light emitter 18.

The light emitter 18 is enabled and disabled by a transmission control signal fed from the controller 34. In cases where the light emitter 18 is enabled, when the start delay circuit 36 outputs a sequence of the remaining preamble and subsequent data to the light emitter 18, the light emitter 18 converts the output signal of the start delay circuit 36 into a corresponding optical signal and emits the optical signal.

As shown in FIG. 2, the second section 14 of the repeater R includes a light receiver 20, a light emitter 22, a carrier sensing circuit 38, and a frequency converter 40. The output terminal of the light receiver 20 is connected to the input terminals of the carrier sensing circuit 38 and the frequency converter 40. The output terminal of the carrier sensing circuit 38 is connected to a control terminal of the light emitter 22 and a third input terminal of the controller 34. The output terminal of the frequency converter 40 is connected to the input terminal of the light emitter 22.

The light receiver 20 has a photosensor part, receiving an optical signal from the light emitter 18 of another repeater R or the present repeater R and converting the optical signal into a corresponding electric signal. The light receiver 20 outputs the electric signal. The output signal of the light receiver 20 is equal to a signal which results from modulating a carrier of the predetermined frequency F2 with transmitted information (data). The transmission of information has the predetermined packet format which includes a sequence of a given-pattern preamble and subsequent data. The output signal of the light receiver 20 is fed to the carrier sensing circuit 38 and the frequency converter 40.

The carrier sensing circuit 38 includes a comparator which detects whether or not the amplitude of the output signal of the light receiver 20 is smaller than a predetermined reference level, that is, whether or not the strength of the optical signal received by the light receiver 20 is smaller than a predetermined reference strength. The carrier sensing circuit 38 outputs a signal representative of the result of the detection (the result of the comparison) to the light emitter 22 and the controller 34. Specifically, the output signal of the carrier sensing circuit 38 assumes a high level when the strength of the optical signal received by the light receiver 20 is equal to or greater than the predetermined reference strength. Otherwise, the output signal of the carrier sensing circuit 38 is in a low level state.

The frequency converter 40 subjects the output signal of the light receiver 20 to frequency conversion, for example, frequency doubling or other frequency multiplying. During the frequency conversion, the carrier frequency F2 of the output signal of the light receiver 20 is changed to a predetermined carrier frequency F3. The carrier frequency F3 is different from the carrier frequencies F1 and F2. Thus, the frequency converter 40 outputs a signal having the carrier frequency F3. The output signal of the frequency converter 40 is fed to the light emitter 22.

The light emitter 22 is enabled and disabled by the output signal of the carrier sensing circuit 38. In cases where the light emitter 22 is enabled, the light emitter 20 converts the output signal of the frequency converter 40 into a corresponding optical signal and emits the optical signal.

The controller 34 and the start delay circuit 36 are designed so as to realize the following processes.

The controller 34 outputs a transmission enabling instruction and a transmission inhibiting instruction to the light emitter 18 in response to the output signals from the carrier sensing circuits 30 and 38 and the start delay circuit 36. The details will follow.

(1) In cases where the carrier sensing circuit 38 detects that the strength of the optical signal received by the light receiver 20 is equal to or greater than the predetermined reference strength, the controller 34 outputs a transmission inhibiting signal to the light emitter 18 regardless of the result of the detection (the comparison) by the carrier sensing circuit 30.

(2) In cases where the carrier sensing circuit 38 detects that the strength of the optical signal received by the light receiver 20 is smaller than the predetermined reference strength while the carrier sensing circuit 30 detects that the strength of the optical signal received by the light receiver 16 is equal to or greater than the predetermined reference strength, the controller 34 outputs a transmission enabling signal to the light emitter 18.

(3) In cases where the carrier sensing circuit 38 detects that the strength of the optical signal received by the light receiver 20 is smaller than the predetermined reference strength while the carrier sensing circuit 30 detects that the strength of the optical signal received by the light receiver 16 is smaller than the predetermined reference strength, the controller 34 outputs a transmission inhibiting signal to the light emitter 18.

The above-mentioned actions (1), (2), and (3) by the controller 34 result in the following operation. The second section 14 of the repeater R can execute a repeater function on a received optical signal independent of the operation of the first section 12 of the repeater R. On the other hand, the first section 12 of the repeater R is enabled to execute a repeater function on a received optical signal provided that a good optical signal is not received by the second section 14 of the repeater R.

The controller 34 and the start delay circuit 36 are designed so as to provide the following additional function. It is now presumed that the start delay circuit 36 is absent. Since the carrier frequencies F2 of signals handled by the light emitter 18 and the light receiver 20 are equal, an optical signal outputted from the light emitter 18 can be accepted by the light receiver 20. Thus, immediately after the transmission of an optical signal from the light emitter 18, the carrier sensing circuit 38 detects that the strength of the optical signal received by the light receiver 20 is equal to or greater than the predetermined reference strength. As a result, the controller 34 outputs a transmission inhibiting signal to the light emitter 18 so that the light emitter 18 is disabled and the transmission of the optical signal from the light emitter 18 is undesirably interrupted. Such a problem is prevented by the provision of the start delay circuit 36 and the operation of the controller 34 in response to the output signal from the start delay circuit 36. Specifically, the start delay circuit 36 has a section, which outputs a transmission starting signal to the controller 34 immediately before or when a packet starts to be fed from the start delay circuit 36 to the light emitter 18 and thus a corresponding optical signal starts to be outputted from the light emitter 18. The controller 34 ignores the output signal from the carrier sensing circuit 38 during a predetermined time in response to the transmission starting signal, so that the light emitter 18 remains enabled until the whole of the packet has been transmitted via the light emitter 18.

Figure 3:
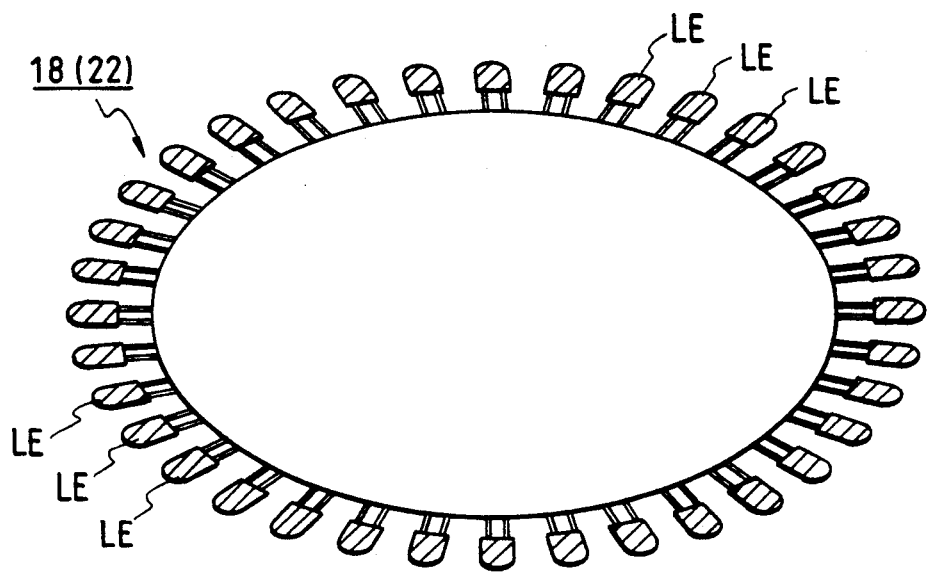
FIG. 3 is a diagram of a portion of the light emitters in the repeater of FIG. 2.
Figure 4:
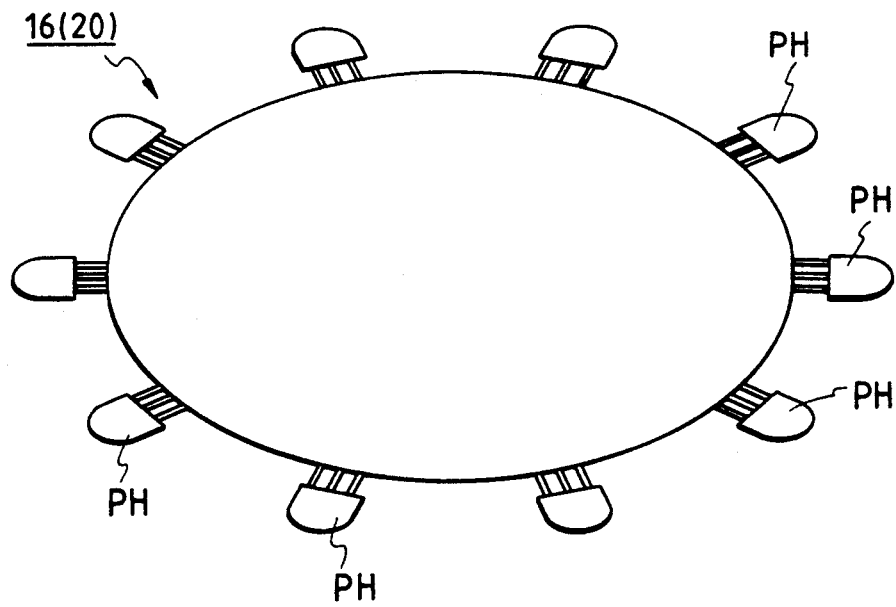
FIG. 4 is a diagram of a portion of the light receivers in the repeater of FIG. 2.

As shown in FIG. 3, each of the light emitters 18 and 22 has a circumferential array of outwardly-facing light emitting elements LE so that an optical signal outputted from the light emitter can travel in all directions. As shown in FIG. 4, each of the light receivers 16 and 20 has a circumferential array of outwardly-facing photo sensing elements PH so that the light receiver can capture optical signals coming along all directions.

A further description will be given with reference to FIGS. 1, 2, and 5. It is presumed that the terminal devices T1, T2, T3, and T4 sequentially transmit optical signals of data packets P1, P2, P3, and P4 as shown in the parts (A), (B), (C), and (D) of FIG. 5. First, the optical signal of the packet P1 is outputted from the light emitter 24 of the terminal device T1. The optical signal of the packet P1 outputted from the light emitter 24 has an on/off frequency equal to the carrier frequency F1. The optical signal of the packet P1 which is outputted from the terminal device T1 is received by the repeaters R1 and R2 as shown in the parts (E) and (F) of FIG. 5. It should be noted that the repeaters R1 and R2 are close to the terminal device T1. Then, the optical signal of the packet P2 is outputted from the terminal device T2, being received by the repeaters R2 and R3 as shown in the parts (F) and (G) of FIG. 5. Subsequently, the optical signal of the packet P3 is outputted from the terminal device T3, being received by the repeaters R3 and R4 as shown in the parts (G) and (H) of FIG. 5.

As described previously, an optical signal outputted from a terminal device T is received by the light receiver 16 of the first section 12 of a repeater R. The light receiver 16 converts the optical signal into a corresponding electric signal. The light receiver 16 outputs the electric signal to the carrier sensing circuit 30. The carrier sensing circuit 30 detects whether or not the amplitude of the output signal of the light receiver 16 is smaller than a predetermined reference level, that is, whether or not the strength of the optical signal received by the light receiver 16 is smaller than a predetermined reference strength. The carrier sensing circuit 30 outputs a signal representative of the result of the detection (the result of the comparison) to the controller 34 and the start delay circuit 36.

The light receiver 16 also outputs the electric signal to the frequency converter 32. The frequency converter 32 subjects the output signal of the light receiver 16 to frequency conversion. During the frequency conversion, the carrier frequency F1 of the output signal of the light receiver 16 is changed to the predetermined carrier frequency F2. The start delay circuit 36 receives the output signal of the frequency converter 32. The start delay circuit 36 deletes a random-length head portion of the preamble from the packet. In the part (I) of FIG. 5, the deleted portion corresponds to a time t1. The start delay circuit 36 outputs a sequence of the remaining preamble and subsequent data to the light emitter 18. Provided that the light emitter receives the transmission enabling instruction from the controller 34, the light emitter 18 converts the output signal of the start delay circuit 36 into a corresponding optical signal and emits the optical signal (see the part (I) of FIG. 5). The optical signal outputted from the light emitter 18 has an on/off frequency equal to the carrier frequency F2.

The optical signal outputted from the light emitter 18 is received by the light receiver 20 of the second section of the same repeater and also the light receivers 20 of the second sections of other repeaters. Each of the second sections of the repeaters converts the received optical of the on/off frequency F2 into a corresponding optical signal having an on/off frequency equal to the carrier frequency F3, and then outputs the optical signal of the on/off frequency F3.

In cases where the terminal device T1 outputs an optical signal of the on/off frequency F1 as denoted by the arrows FU1 and FU2 of FIG. 1, the optical signal is received by the first sections 12 of the repeaters R1 and R2. Each first section 12 converts the optical signal of the on/off frequency F1 into a corresponding optical signal of the on/off frequency F2, and outputs the optical signal of the on/off frequency F2. The optical signal of the on/off frequency F2 which is outputted from each first section 12 is received by the second sections 14 of the repeaters R as shown by the arrows FM of FIG. 1. Each second section 14 converts the optical signal of the on/off frequency F2 into a corresponding optical signal of the on/off frequency F3, and outputs the optical signal of the on/off frequency F3. The optical signals of the on/off frequency F3 which are outputted from the second sections 14 of the repeaters R are received by the light receivers 26 of the terminal devices T2, T3, . . . as shown in the arrows FD1, FD2, . . . of FIG. 1.

It is now presumed that the terminal device T2 transmits an optical signal immediately after the terminal device T1 transmits an optical signal. After the first section 12 of the repeater R1 outputs an optical signal in response to the optical signal transmitted by the terminal device T1 and then the second section 14 of the repeater R2 receives the optical signal from the first section 12 of the repeater R1, the first section 12 of the repeater R2 receives the optical signal from the terminal device T2. Thus, in the repeater R2, the carrier sensing circuit 38 in the second section 14 informs the controller 34 of the detection of a good-level optical signal from the first repeater R1 before the carrier sensing circuit 30 in the first section 12 informs the controller 34 and the start delay circuit 36 of the detection of a good-level optical signal from the terminal device T2. As a result, the controller 34 of the repeater R2 suspends the transmission function of the first section 12 of the repeater R2. Similarly, the transmission functions of the first sections 12 of other repeaters (except the repeater R1) are suspended. On the other hand, the first section 12 of the repeater R1 remains enabled until the transmission of the packet P1 is completed. Thus, under such conditions, only one of the first sections 12 of the repeaters R is enabled while the others are suspended. In other words, only one of the repeaters R is enabled.

Figure 5:
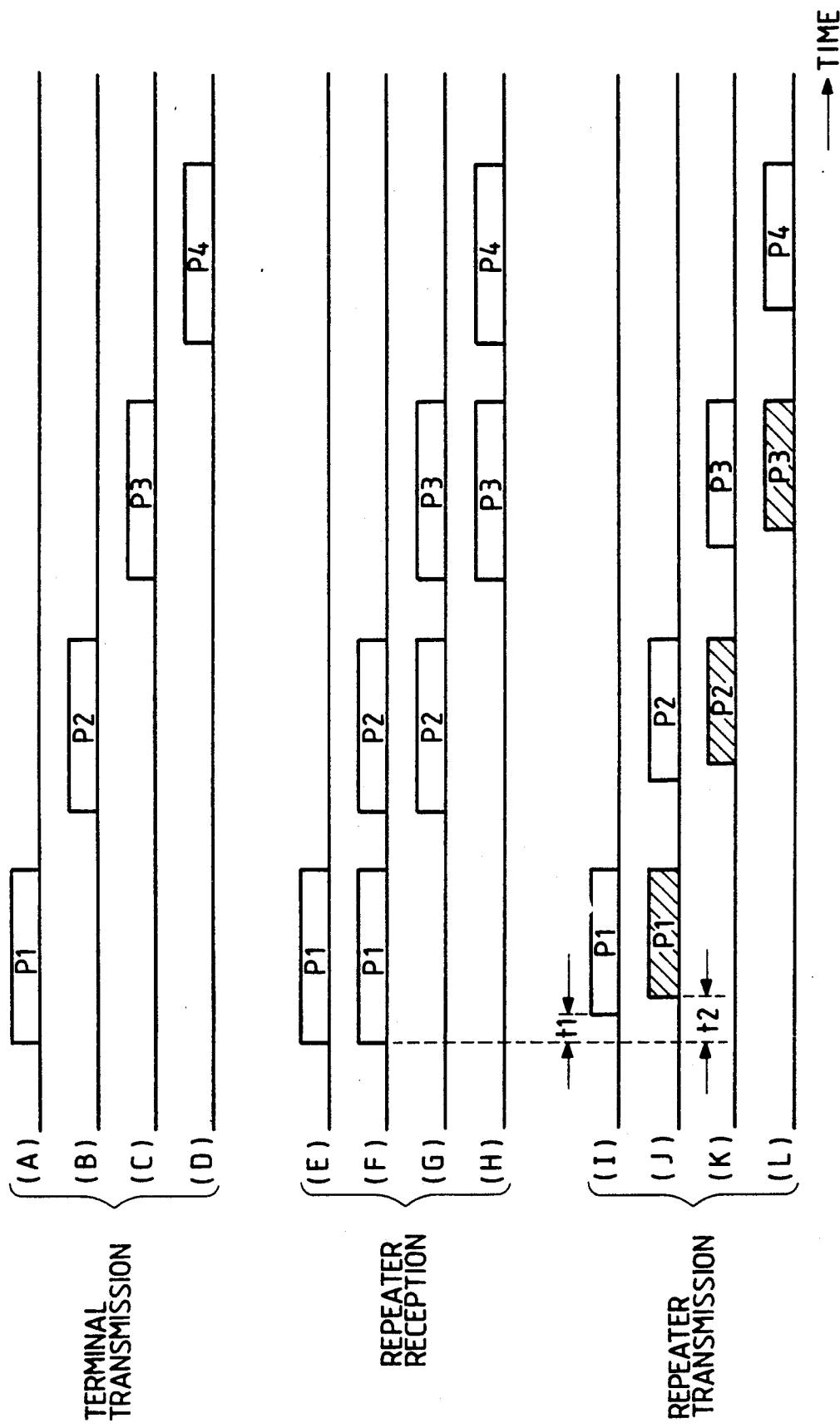
FIG. 5 is a timing diagram showing examples of transmitting conditions of the terminal devices, receiving conditions of the repeaters, and transmitting conditions of the repeaters in the repeater system of FIG. 1.

In cases where the optical signal of the packet P1 which is outputted from the terminal device T1 is received by the repeaters R1 and R2, the start delay circuit 36 of the repeater R1 deletes a head portion of the preamble from the packet P1 which corresponds to the delay time t1 as shown in the part (I) of FIG. 5 while the start delay circuit 36 of the repeater R2 deletes a head portion of the preamble from the packet P1 which corresponds to a delay time t2 as shown in the part (J) of FIG. 5. The delay time t2 is longer than the delay time t1 so that the first section 12 of the repeater R1 is enabled to output an optical signal in response to the received optical signal as shown in the part (I) of FIG. 5. The optical signal outputted from the first section 12 of the repeater R1 is received by the second section 14 of the repeater R2. Thus, in the repeater R2, the controller 34 disables the transmission function of the first section 12 in response to the output signal from the carrier sensing circuit 38 so that the transmission of the optical signal from the first section 12 is prevented or inhibited as shown by the hatched region in the part (J) of FIG. 5. In this way, simultaneous signal transmissions by the first sections 12 of the repeaters R1 and R2 are prevented. To ensure this preventive operation, the delay times t1 and t2 are set to random-number multiples of a unit time $\Delta t$ which are longer than a period from the moment of the reception of the optical signal by the second section 14 of a repeater R to the moment of the responsive execution of disabling the first section 12 of the repeater R.

As described previously, only one of the first sections 12 of the repeaters R is enabled while all the second sections 14 of the repeaters R are enabled. For example, the first and second sections 12 and 14 of the repeater R1 are enabled while only the second sections 14 of the repeaters R2, R3, and R4 are enabled as shown in FIG. 1.

As described previously, when the light receiver 20 of a repeater R receives an optical signal of the on/off frequency F2, the light receiver 20 converts the received optical signal into a corresponding electric signal. The light receiver 20 outputs the electric signal to the frequency converter 40. The frequency converter 40 subjects the output signal of the light receiver 20 to frequency doubling or other frequency multiplying. Through the frequency multiplying, the carrier frequency F2 of the output signal of the light receiver 20 is changed to the carrier frequency F3. The frequency multiplying enables reliable synchronization with respect to the carrier in cases where a plurality of repeaters R simultaneously emit optical signals of the on/off frequency F3. Also, the light receiver 20 outputs the electric signal to the carrier sensing circuit 38. The carrier sensing circuit 38 which detects whether or not the amplitude of the output signal of the light receiver 20 is smaller than the predetermined reference level, that is, whether or not the strength of the optical signal received by the light receiver 20 is smaller than the predetermined reference strength. The carrier sensing circuit 38 outputs a signal representative of the result of the detection (the result of the comparison) to the light emitter 22. Specifically, when the carrier sensing circuit 38 detects that the strength of the optical signal received by the light receiver 20 is equal to or greater than the predetermined reference strength, the carrier sensing circuit 38 outputs a transmission enabling signal to the light emitter 22. Otherwise, the carrier sensing circuit 38 outputs a transmission inhibition signal to the light emitter 22. The light emitter 22 receives the output signal from the frequency converter 40. When the light emitter 20 is enabled in response to the output signal from the carrier sensing circuit 38, the light emitter 20 converts the output signal of the frequency converter 40 into a corresponding optical signal and emits the optical signal. Since signal propagation paths between the repeaters R are maintained, the second sections 14 of all the repeaters R perform such emissions of optical signals. The emissions of the optical signals from the second sections 14 of the repeaters R provide downlink signal transmissions FD1, FD2, . . . toward terminals T. As a result, the communication between terminal devices T is executed via a repeater or repeaters R near the terminal devices T.

Figure 6:
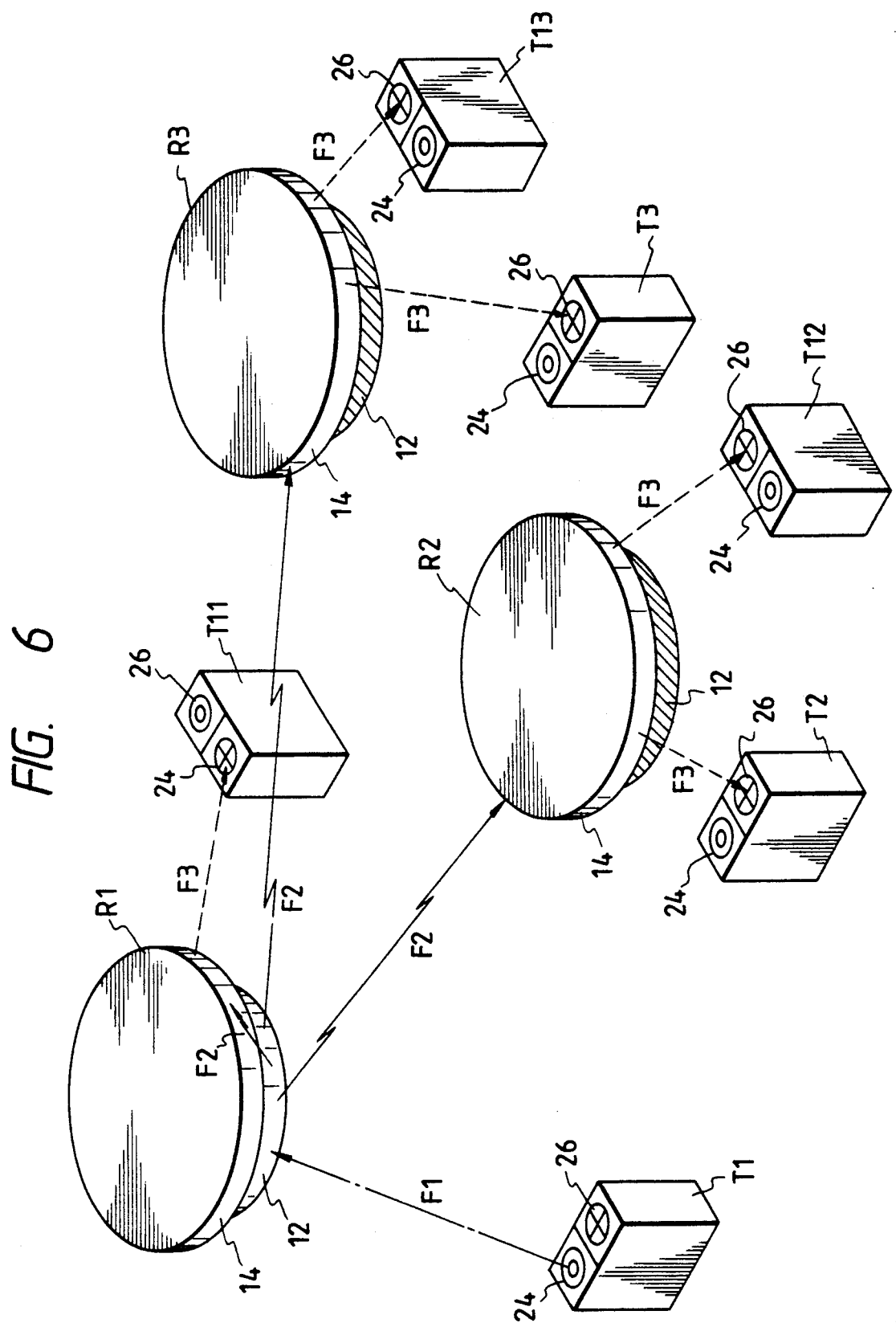
FIG. 6 is a perspective view of the repeater system according to the first embodiment of this invention.

With reference to FIG. 6, the terminal device T1 outputs an optical signal of the on/off frequency F1 along an uplink signal transmission path, and the outputted optical signal is received by the first section 12 of the repeater R1. The first section 12 of the repeater R1 outputs an optical signal of the on/off frequency F2, which is received by the second sections 14 of all the repeaters R1, R2, and R3. The second sections 14 of the repeaters R1, R2, and R3 output optical signals of the on/off frequency F3 along downlink signal transmission paths, and the outputted optical signals are received by the terminals T2, T3, T11, T12, and T13. The first sections 12 of the repeaters R2 and R3 are deactivated.

As shown in FIG. 15, the controller 34 includes a monostable multivibrator 34A, a D flip-flop 34B, and an AND gate 34C. The output signal Sa from the carrier sensing circuit 30 is fed to the input terminal of the monostable multivibrator 34A. The output signal Sa from the carrier sensing circuit 30 has a waveform such as shown in FIG. 16. Specifically, the output signal Sa from the carrier sensing circuit 30 assumes a high level when a good carrier is detected. Otherwise, the output signal Sa from the carrier sensing circuit 30 is in a low level state. The monostable multivibrator 34A generates a short pulse Sd in response to each change of the signal Sa from the low level to the high level as shown in FIG. 16. The output signal Sd from the monostable multivibrator 34A is fed to the control terminal $\overline{PR}$ of the D flip-flop 34B. The output signal Sb from the carrier sensing circuit 38 is fed to the input terminal D of the D flip-flop 34B. The output signal Sb from the carrier sensing circuit 38 has a waveform such as shown in FIG. 16. .Specifically, the output signal Sb from the carrier sensing circuit 38 assumes a high level when a good carrier is detected. Otherwise, the output signal Sb from the carrier sensing circuit 38 is in a low level state. The transmission starting signal Sc outputted from the start delay circuit 36 is fed to the input terminal CK of the D flip-flop 34B and a first input terminal of the AND gate 34C. The transmission starting signal Sc has a waveform such as shown in FIG. 16. The D flip-flop 34B samples and holds the output signal Sb of the carrier sensing circuit 38 in response to each change of the transmission starting signal Sc from the low level to the high level. The D flip-flop 34B is changed to a set state in response to the output signal Sd of the monostable multivibrator 34A. The D flip-flop 34B generates the $\overline{Q}$ output signal Se which depends on the signals Sb, Sc, and Sd as shown in FIG. 16. The $\overline{Q}$ output signal Se of the D flip-flop 34B is fed to a second input terminal of the AND gate 34C. The AND gate 34C executes logical AND operation between the signals Sc and Se, generating a transmission control signal Sf which depends on the signals Sc and Se as shown in FIG. 16. The AND gate 34C outputs the transmission control signal Sf to the light emitter 18. The transmission control signal Sf in a high level state corresponds to the transmission enabling signal. The transmission control signal Sf in a low level state corresponds to the transmission inhibiting signal.

As shown in FIG. 16, provided that the output signal Sb of the carrier sensing circuit 38 is in the low level state, the transmission control signal Sf assumes the high level in synchronism with a change of the transmission starting signal Sc from the low level to the high level. Then, a change of the output signal Sb of the carrier sensing circuit 38 from the low level to the high level is ignored by the D flip-flop 34B, and the transmission control signal Sf remains in the high level state independent of the change of the signal Sb from the low level to the high level. The transmission control signal Sf returns to the low level state when the transmission starting signal moves to the low level state.

Figure 17:
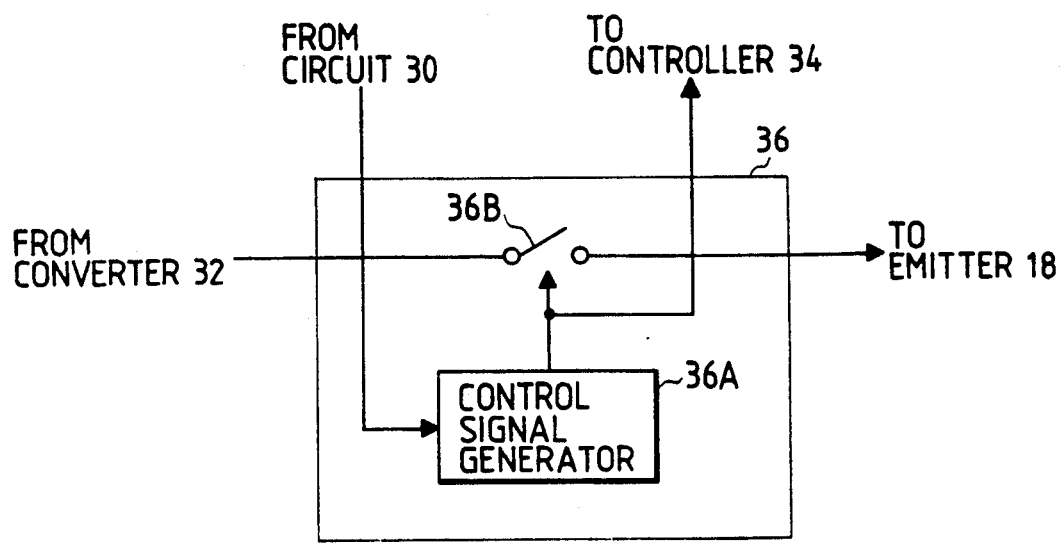
FIG. 17 is a block diagram of the start delay circuit of FIG. 2.

As shown in FIG. 17, the start delay circuit 36 includes a control signal generator 36A and a switch 36B. The switch 36B has first and second terminals, and a control terminal. The first and second terminals of the switch 36B are connected and disconnected to and from each other in response to a signal fed to the control terminal thereof. The first terminal of the switch 36B is connected to the frequency converter 32. The second terminal of the switch 36B is connected to the light transmitter 18. The control signal generator 36A receives the output signal from the carrier sensing circuit 30. The control signal generator 36A generates the transmission starting signal on the basis of the output signal of the carrier sensing circuit 30. The control signal generator 36A outputs the transmission starting signal to the control terminal of the switch 36B and the controller 34. When the transmission starting signal assumes a high level state or an ON state, the switch 36B is closed so that the output signal of the frequency converter 32 is transmitted to the light transmitter 18. When the transmission starting signal assumes a low level state or an OFF state, the switch 36B is opened so that the transmission of the output signal of the frequency converter 32 to the light transmitter 18 is inhibited.

Figure 18:
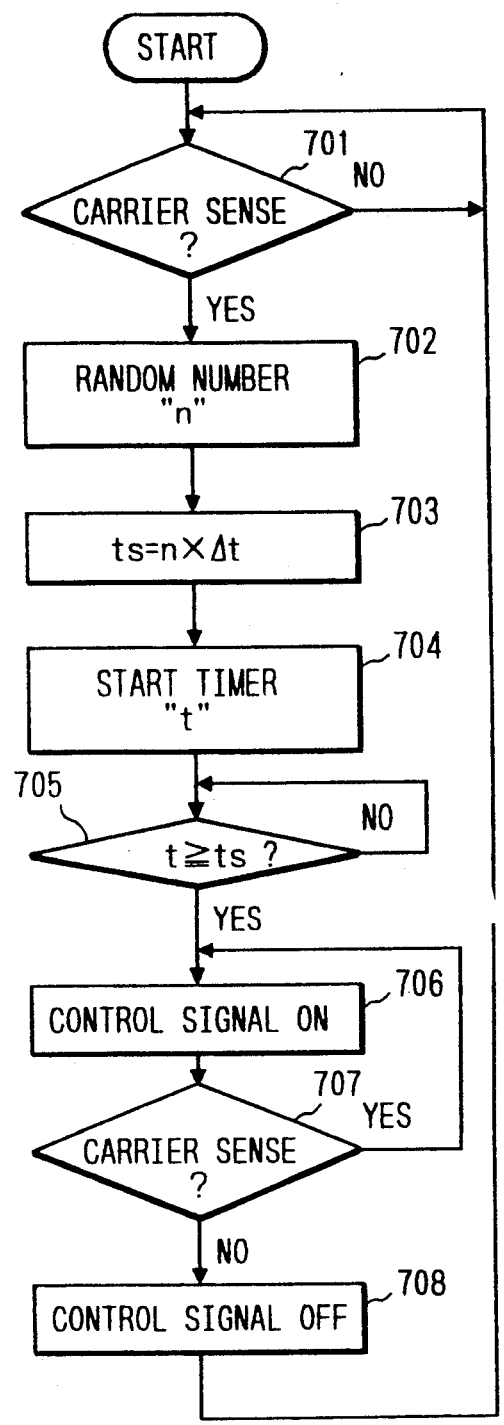
FIG. 18 is a flowchart of a program controlling the control signal generator of FIG. 17.

The control signal generator 36A includes a microcomputer or a similar device having a combination of a processing section, a ROM, a RAM, and an I/O port. The control signal generator 36A operates in accordance with a program stored in the ROM. FIG. 18 is a flowchart of the program.

As shown in FIG. 18, a first step 701 of the program decides whether or not the output signal of the carrier sensing circuit 30 is in the high level state. When the output signal of the carrier sensing circuit 30 is in the high level state, the program advances to a step 702. Otherwise, the step 701 is reiterated. The step 702 generates a random number "n" in a given range. A step 703 following the step 702 calculates a time ts from the random number "n" and the predetermined unit time $\Delta t$ by referring to the equation as "ts=n×$\Delta t$". The predetermined unit time $\Delta t$ is equal to, for example, the period of a clock signal used in the control signal generator 36A. A step 704 following the step 703 starts a timer which measures an elapsed time "t". After the step 704, the program advances to a step 705. The step 705 compares the elapsed time "t" with the time ts. When the elapsed time "t" is shorter than the time ts, the step 705 is reiterated. When the elapsed time "t" reaches the time ts, the program advances to a step 706. The step 706 sets the transmission starting signal to a high level state or an ON state. A step 707 following the step 706 decides whether or not the output signal of the carrier sensing circuit 30 is in the high level state. When the output signal of the carrier sensing circuit 30 is in the high level state, the program returns to the step 706. When the output signal of the carrier sensing circuit 30 is in the low level state, the program advances to a step 708. The step 708 sets the transmission starting signal to a low level state or an OFF state. After the step 708, the program returns to the step 701.

Figure 19:
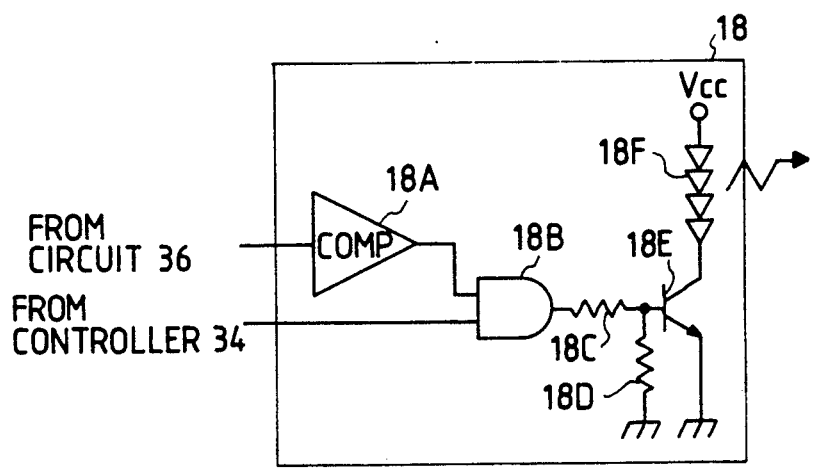
FIG. 19 is a diagram of one of the light emitters of FIG. 2.

The light emitter 18 and the light emitter 22 are similar in structure, and only the light emitter 18 will be described in detail hereinafter. As shown in FIG. 19, the light emitter 18 includes a comparator 18A, an AND gate 18B, resistors 18C, and 18D, a switching transistor 18E, and a series combination 18F of LEDs. The comparator 18A changes the output signal of the start delay circuit 36 into a corresponding good binary signal. The output signal from the comparator 18A is fed to a first input terminal of the AND gate 18B. A second input terminal of the AND gate 18B receives the transmission control signal from the controller 34. The output terminal of the AND gate 18B is connected to the base of the transistor 18E via the resistor 18C. The base of the transistor 18E is grounded via the resistor 18D. The emitter of the transistor 18E is directly grounded. The collector of the transistor 18E is connected to a positive power supply line Vcc via the LED combination 18F. When the transmission control signal signal is in the high level state, that is, when the transmission enabling signal is inputted, the AND gate 18B is open so that the output signal from the comparator 18A is transmitted to the base of the transistor 18E. In this case, the transistor 18E is switched in response to the output signal from the start delay circuit 36, and therefore the LED combination 18F is activated and deactivated in accordance with the output signal from the start delay circuit 36. When the transmission control signal signal is in the low level state, that is, when the transmission inhibiting signal is inputted, the AND gate 18B is closed so that the transmission of the output signal from the comparator 18A to the base of the transistor 18E is inhibited. In this case, the transistor 18E remains non-conductive, and therefore the LED combination 18F continues to be deactivated independent of the output signal from the start delay circuit 36.

DESCRIPTION OF THE SECOND PREFERRED EMBODIMENT

Figure 7:
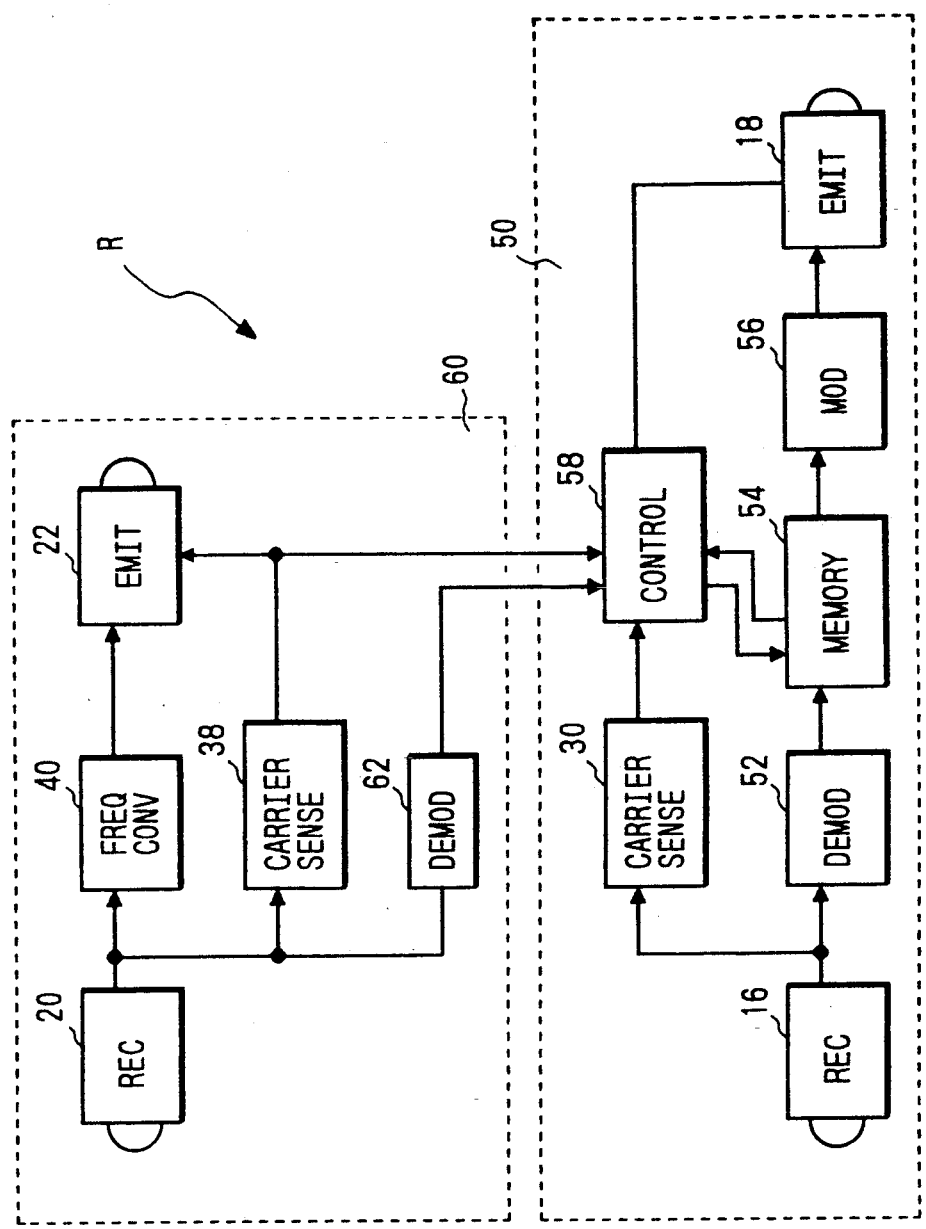
FIG. 7 is a block diagram of a repeater in a repeater system according to a second embodiment of this invention.
Figure 8:
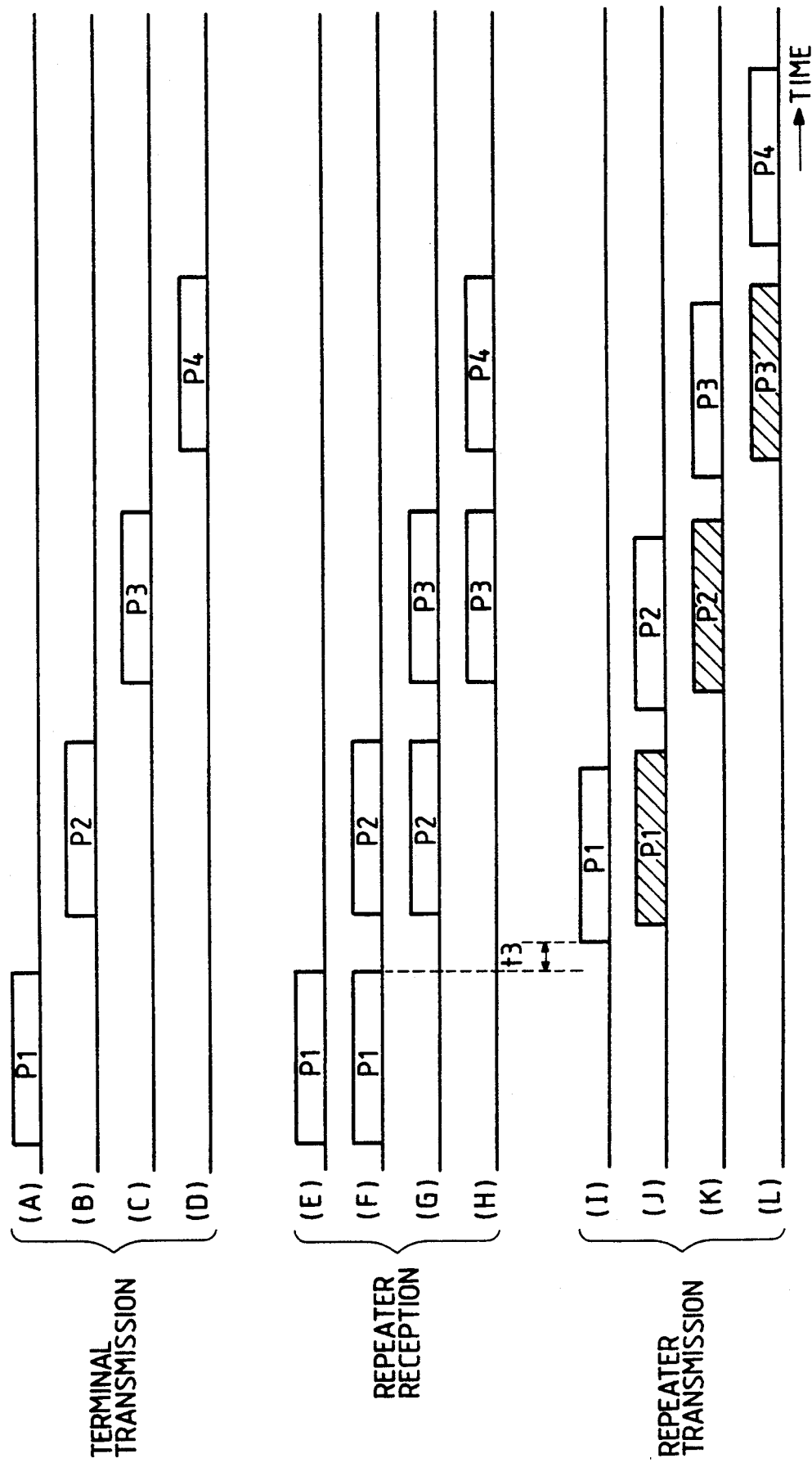
FIG. 8 is a timing diagram showing examples of transmitting conditions of terminal devices, receiving conditions of repeaters, and transmitting conditions of the repeaters in the repeater system according to the second embodiment of this invention.

FIGS. 7 and 8 relate to a second embodiment of this invention which is similar to the embodiment of FIGS. 1-6, and 15-19 except for design changes described hereinafter.

As shown in FIG. 7, a repeater R is divided into first and second sections 50 and 60. The first section 50 of the repeater R includes a light receiver 16, a light emitter 18, a carrier sensing circuit 30, a demodulator 52, a memory buffer 54, a modulator 56, and a controller 58. The output terminal of the light receiver 16 is connected to the input terminals of the carrier sensing circuit 30 and the demodulator 52. The output terminal of the demodulator 52 is connected to the input terminal of the memory buffer 54. The output terminal of the memory buffer 54 is connected to the input terminal of the modulator 56. The output terminal of the modulator 56 is connected to the input terminal of the light emitter 18. The memory buffer 54 is connected to the controller 58. The output terminal of the carrier sensing circuit 30 is connected to a first input terminal of the controller 58. The output terminal of the controller 34 is connected to a control terminal of the light emitter 18.

The light receiver 16 receives an optical signal from a terminal device T, and converts the optical signal into a corresponding electric signal. The light receiver 16 outputs the electric signal to the carrier sensing circuit 30 and the demodulator 52. The output signal of the light receiver 16 is equal to a signal which results from modulating the carrier of the predetermined frequency F1 with transmitted information (data). The demodulator 52 recovers the data from the output signal of the light receiver 16, and outputs the recovered data to the memory buffer 54. The carrier sensing circuit 30 detects whether or not the amplitude of the output signal of the light receiver 16 is smaller than the predetermined reference level, that is, whether or not the strength of the optical signal received by the light receiver 16 is smaller than the predetermined reference strength. The carrier sensing circuit 30 outputs a signal representative of the result of the detection (the result of the comparison) to the controller 58. Specifically, the output signal of the carrier sensing circuit 30 assumes a high level when the strength of the optical signal received by the light receiver 16 is equal to or greater than the predetermined reference strength. Otherwise, the output signal of the carrier sensing circuit 30 is in the low level state. When the carrier sensing circuit 30 detects that the strength of the optical signal received by the light receiver 16 is equal to or greater than the predetermined reference strength, the controller 58 outputs a data writing instruction to the memory buffer 54 in response to the output signal from the carrier sensing circuit 30. As a result, the output data from the demodulator 52 is stored into the memory buffer 54. When a time t3 determined at random elapses since the moment of the end of the packet (see FIG. 8), the controller 58 outputs a data reading instruction to the memory buffer 54 so that the data is read out from the memory buffer 54. The output data from the memory buffer 54 is fed to the modulator 56. The modulator 56 modulates a carrier of a predetermined frequency F2 in accordance with the output data from the memory buffer 54. The carrier frequency F2 is different from the carrier frequency F1. Thus, the modulator 56 outputs a signal having the carrier frequency F2. The output signal from the modulator 56 is fed to the light emitter 18. The light emitter 18 is enabled and disabled by a transmission control signal fed from the controller 58. In cases where the light emitter 18 is enabled, the light emitter 18 converts the output signal of the modulator 56 into a corresponding optical signal and emits the optical signal (see the parts (I)-(L) of FIG. 8).

As shown in FIG. 7, the second section 60 of the repeater R includes a light receiver 20, a light emitter 22, a carrier sensing circuit 38, a frequency converter 40, and a demodulator 62. The output terminal of the light receiver 20 is connected to the input terminals of the carrier sensing circuit 38, the frequency converter 40, and the demodulator 62. The output terminal of the carrier sensing circuit 38 is connected to a control terminal of the light emitter 22 and a second input terminal of the controller 58. The output terminal of the frequency converter 40 is connected to the input terminal of the light emitter 22. The output terminal of the demodulator 62 is connected to a third input terminal of the controller 58.

The light receiver 20 receives an optical signal from the light emitter 18 of another repeater R or the present repeater R, and converts the optical signal into a corresponding electric signal. The light receiver 20 outputs the electric signal to the carrier sensing circuit 38, the frequency converter 40, and the demodulator 62. The output signal of the light receiver 20 is equal to a signal which results from modulating the carrier of the predetermined frequency F2 with transmitted information (data). The carrier sensing circuit 38 detects whether or not the amplitude of the output signal of the light receiver 20 is smaller than the predetermined reference level, that is, whether or not the strength of the optical signal received by the light receiver 20 is smaller than the predetermined reference strength. The carrier sensing circuit 38 outputs a signal representative of the result of the detection (the result of the comparison) to the light emitter 22 and the controller 58. Specifically, the output signal of the carrier sensing circuit 38 assumes a high level when the strength of the optical signal received by the light receiver 20 is equal to or greater than the predetermined reference strength. Otherwise, the output signal of the carrier sensing circuit 38 is in a low level state. The frequency converter 40 subjects the output signal of the light receiver 20 to frequency conversion, for example, frequency doubling or other frequency multiplying. During the frequency conversion, the carrier frequency F2 of the output signal of the light receiver 20 is changed to the predetermined carrier frequency F3. The carrier frequency F3 is different from the carrier frequencies F1 and F2. Thus, the frequency converter 40 outputs a signal having the carrier frequency F3. The output signal of the frequency converter 40 is fed to the light emitter 22. The light emitter 22 is enabled and disabled by the output signal of the carrier sensing circuit 38. When the carrier sensing circuit 38 detects that the strength of the optical signal received by the light receiver 20 is equal to or greater than the predetermined reference strength, the light emitter 22 is enabled by the output signal from the carrier sensing circuit 38. Otherwise, the light emitter 22 is disabled. In cases where the light emitter 20 is enabled, the light emitter 20 converts the output signal of the frequency converter 40 into a corresponding optical signal and emits the optical signal. The demodulator 62 recovers data from the output signal of the light receiver 20, and outputs the recovered data to the controller 58. In cases where the carrier sensing circuit 38 informs the controller 58 that the strength of the optical signal received by the light receiver 20 is equal to or greater than the predetermined reference strength, the controller 58 compares the output data of the demodulator 62 with the data in the memory buffer 54. When the output data of the demodulator 62 agrees with the data in the memory buffer 54, the controller 58 erases the data from the memory buffer 54. Otherwise, the data in the memory buffer 54 is kept unchanged. The agreement between the output data of the demodulator 62 and the data in the memory buffer 54 means that the data in the memory buffer 54 is successfully transmitted via the light emitter 18 and is successfully received via the light receiver 20. Accordingly, when such successful transmission of the data in the memory buffer 54 is confirmed, the data is erased from the memory buffer 54.

The controller 58 includes a microcomputer or a similar device having a combination of an I/O section, a ROM, a RAM, and a processing section. The controller 58 operates in accordance with a program stored in the ROM. The program is designed so as to realize the previously-mentioned operation of the controller 58.

In cases where terminal devices T sequentially output optical signals of packets P1, P2, P3, and P4 as shown in the parts (A)-(D) of FIG. 8, repeaters R receive these optical signals as shown in the parts (E)-(H). It is understood from the parts (I)-(L) of FIG. 8 that only one of the first sections 50 of the repeaters R is enabled while the others are disabled. The first section 50 of a repeater R starts to transmit the packet P1 at a moment which follows the moment of the end of the reception of the packet P1 by the random time t3 (see the parts (F) and (I) of FIG. 8). In FIG. 8, the packets P1, P2, and P3 denoted by the hatched regions are not transmitted.

Figure 20:
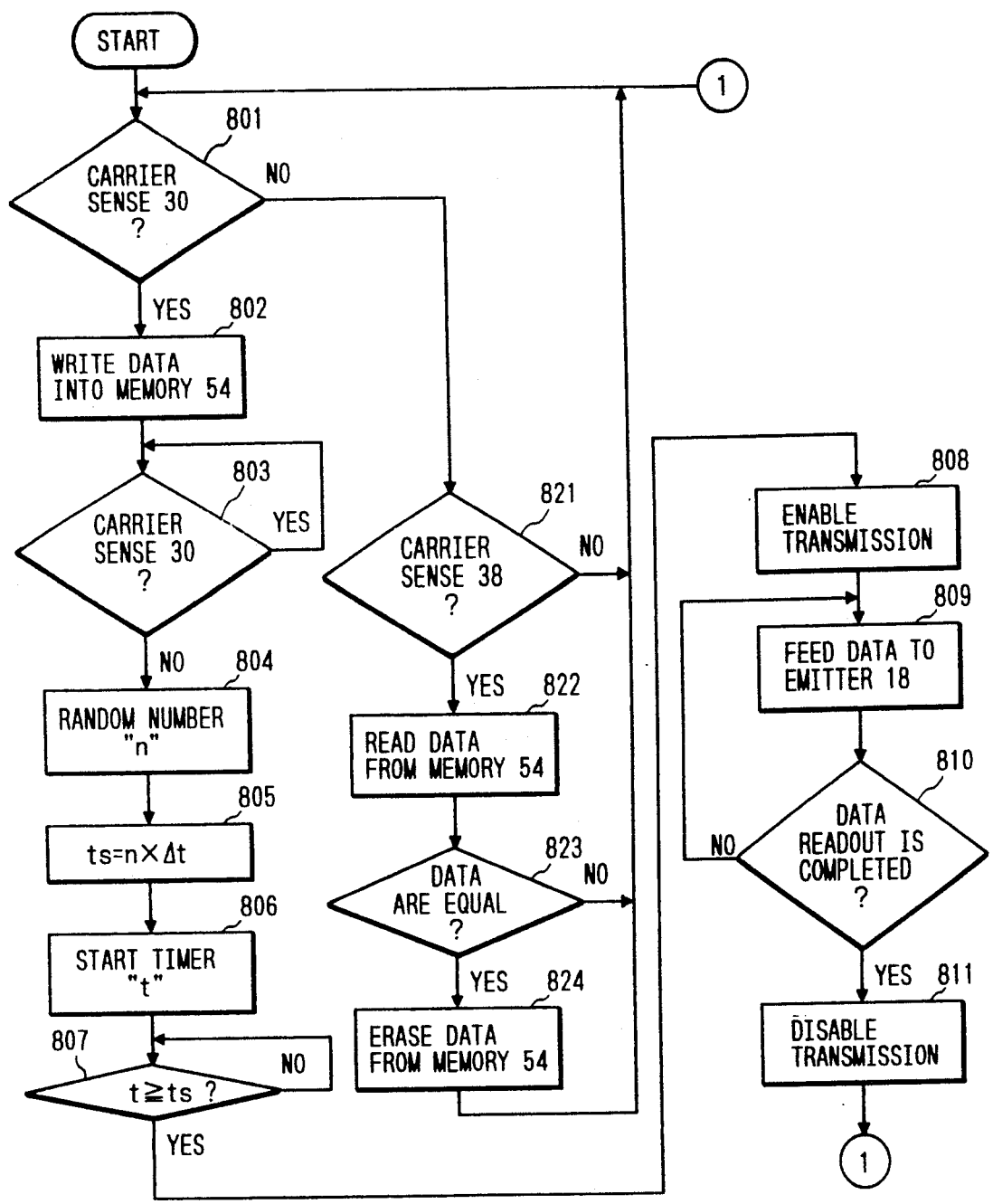
FIG. 20 is a flowchart of a program controlling the controller of FIG. 7.

FIG. 20 is a flowchart of the program operating the controller 58. As shown in FIG. 20, a first step 801 of the program decides whether or not the output signal of the carrier sensing circuit 30 is in the high level state. When the output signal of the carrier sensing circuit 30 is in the high level state, the program advances to a step 802. Otherwise, the program advances to a step 821. The step 802 outputs a write signal to the memory buffer 54 so that the output data of the demodulator 52 will be written into the memory buffer 54. After the step 802, the program advances to a step 803. The step 803 decides whether or not the output signal of the carrier sensing circuit 30 is in the high level state. When the output signal of the carrier sensing circuit 30 is in the high level state, the step 803 is reiterated. Otherwise, the program advances to a step 804. The step 804 generates a random number "n" in a given range. A step 805 following the step 804 calculates a time ts from the random number "n" and a predetermined unit time Δt by referring to the equation as "ts=n×Δt". The unit time Δt is equal to, for example, the period of a clock signal used in the controller 58. A step 806 following the step 805 starts a timer which measures an elapsed time "t". After the step 806, the program advances to a step 807. The step 807 compares the elapsed time "t" with the time ts. When the elapsed time "t" is shorter than the time ts, the step 807 is reiterated. When the elapsed time "t" reaches the time ts, the program advances to a step 808. The step 808 outputs a transmission enabling signal to the light emitter 18. After the step 808, the program advances to a step 809. The step 809 outputs a read signal to the memory buffer 54, reading out the data from the memory buffer 54 and transmitting the data to the light emitter 18. A step 810 decides whether or not reading the data from the memory buffer 54 is completed. When reading the data from the memory buffer 54 is completed, the program advances to a step 811. Otherwise, the program returns to the step 809. The step 811 outputs a transmission inhibiting signal to the light emitter 18. After the step 811, the program returns to the step 801. The step 821 decides whether or not the output signal of the carrier sensing circuit 38 is in the high level state. When the output signal of the carrier sensing circuit 38 is in the high level state, the program advances to a step 822. Otherwise, the program returns to the step 801. The step 822 reads out the data from the memory buffer 54. A step 823 following the step 822 compares the data from the memory buffer 54 and the data from the demodulator 62. When the data from the memory buffer 54 is equal to the data from the demodulator 62, the program advances to a step 824. Otherwise, the program returns to the step 801. The step 824 erases the data from the memory buffer 54. After the step 824, the program returns to the step 801.

DESCRIPTION OF THE THIRD PREFERRED EMBODIMENT

Figure 9:
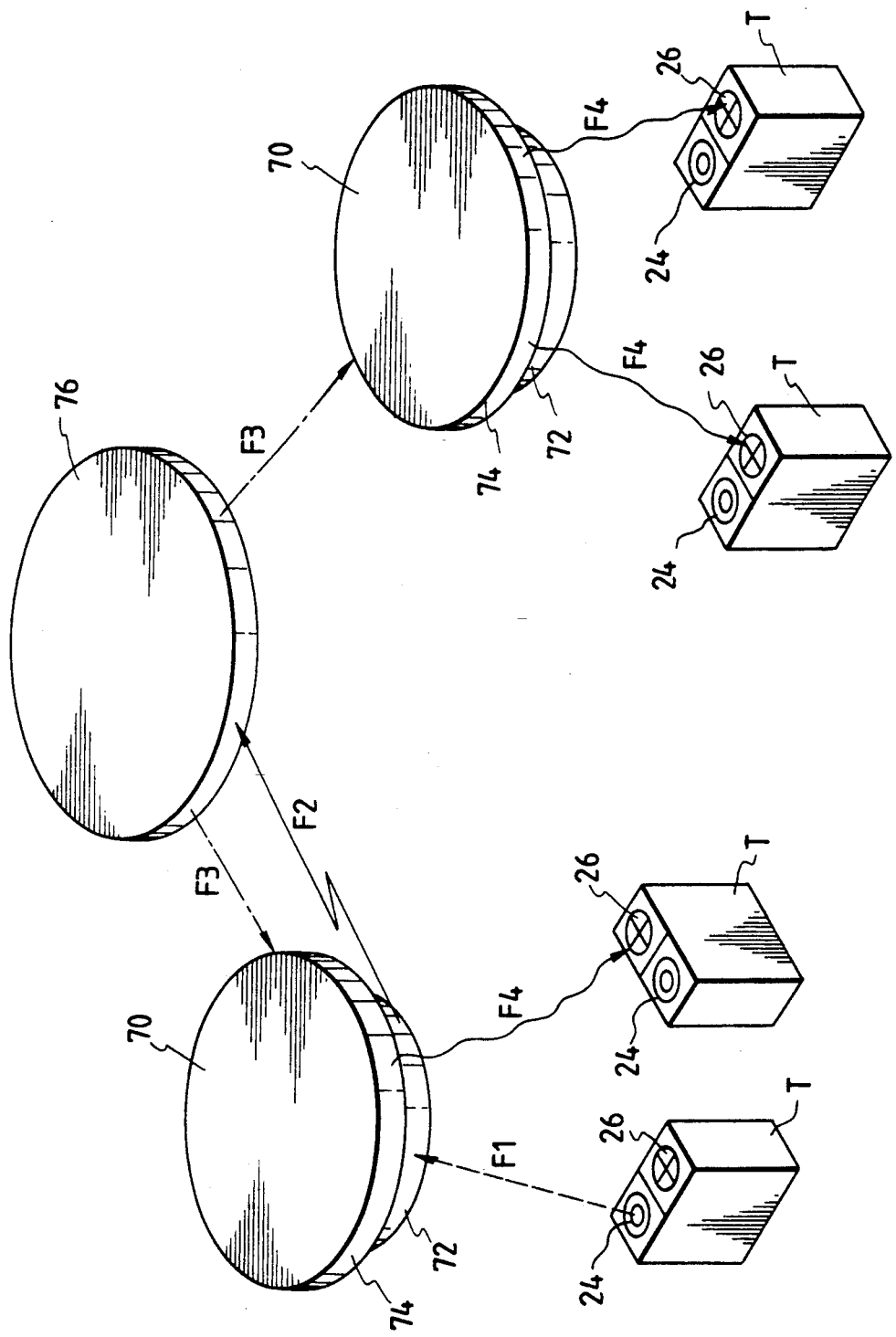
FIG. 9 is a perspective view of a repeater system according to a third embodiment of this invention.

FIG. 9 shows a third embodiment of this invention which is similar to the embodiment of FIGS. 1-6, and 15-19 except for design changes described hereinafter.

The embodiment of FIG. 9 includes a host repeater 76 and similar end repeaters 70. The communication between terminal devices T is generally executed via a first end repeater 70, the host repeater 76, and a second end repeater 70. In some cases, the communication between terminal devices T is executed via a first end repeater 70, the host repeater 76, and the first end repeater 70.

Figure 10:
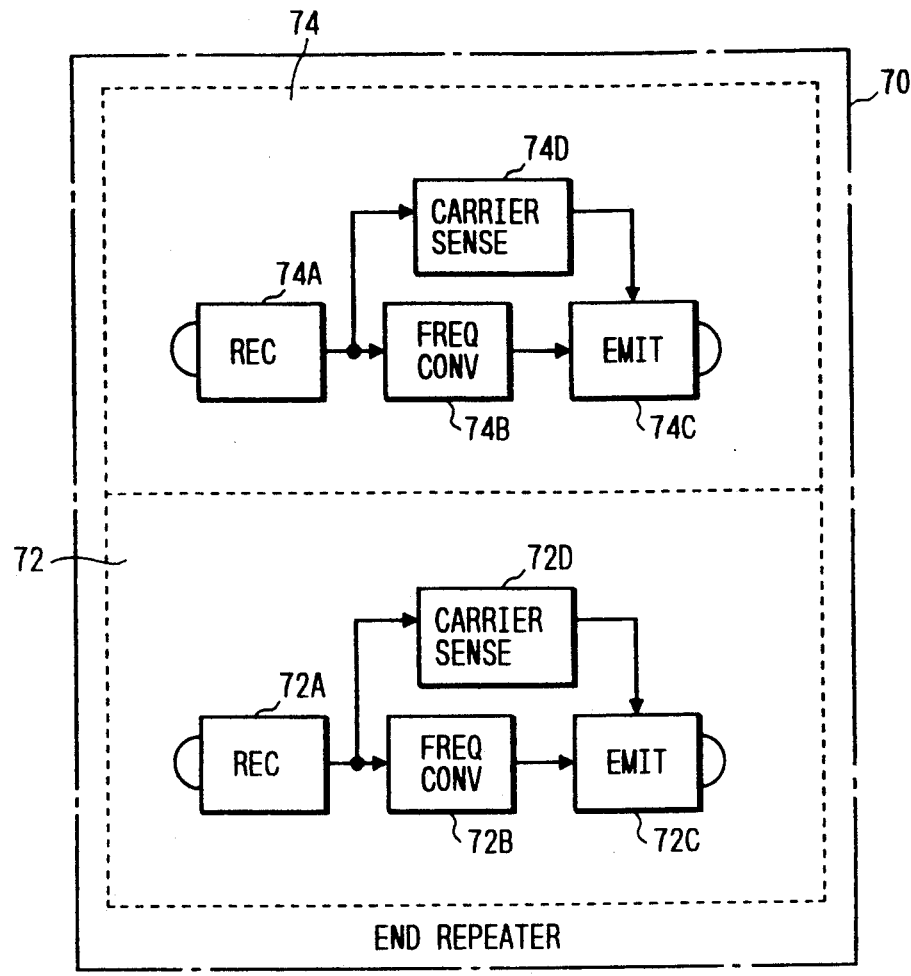
FIG. 10 is a block diagram of an end repeater in the repeater system of FIG. 9.

As shown in FIG. 10, each end repeater 70 is divided into first and second sections 72 and 74. The first repeater section 72 includes a light receiver 72A, a frequency converter 72B, a light emitter 72C, and a carrier sensing circuit 72D. The output terminal of the light receiver 72A is connected to the input terminals of the frequency converter 72B and the carrier sensing circuit 72D. The output terminal of the frequency converter 72B is connected to the input terminal of the light emitter 72C. The output terminal of the carrier sensing circuit 72D is connected to a control terminal of the light emitter 72C.

The light receiver 72A receives an optical signal from a terminal device T, and converts the optical signal into a corresponding electric signal. The light receiver 72A outputs the electric signal to the frequency converter 72B and the carrier sensing circuit 72D. The output signal of the light receiver 72A has the predetermined carrier frequency F1. The carrier sensing circuit 72D detects whether or not the amplitude of the output signal of the light receiver 72A is smaller than a predetermined reference level, that is, whether or not the strength of the optical signal received by the light receiver 72A is smaller than a predetermined reference strength. The carrier sensing circuit 72D outputs a signal representative of the result of the detection (the result of the comparison) to the light emitter 72C. The frequency converter 72B subjects the output signal of the light receiver 72A to frequency conversion. During the frequency conversion, the carrier frequency F1 of the output signal of the light receiver 72A is changed to the predetermined carrier frequency F2. The carrier frequency F2 is different from the carrier frequency F1. Thus, the frequency converter 72B outputs a signal having the carrier frequency F2. The output signal from the frequency converter 72B is fed to the light emitter 72C. The light emitter 72C is enabled and disabled by the output signal from the carrier sensing circuit 72D. When the carrier sensing circuit 72D detects that the strength of the optical signal received by the light receiver 72A is equal to or greater than the predetermined reference strength, the light emitter 72C is enabled in response to the output signal from the carrier sensing circuit 72D so that the light emitter 72C converts the output signal of the frequency converter 72B into a corresponding optical signal and emits the optical signal toward the host repeater 76.

As shown in FIG. 10, the second section 74 of the end repeater 70 includes a light receiver 74A, a frequency converter 74B, a light emitter 74C, and a carrier sensing circuit 74D. The output terminal of the light receiver 74A is connected to the input terminals of the frequency converter 74B and the carrier sensing circuit 74D. The output terminal of the frequency converter 74B is connected to the input terminal of the light emitter 74C. The output terminal of the carrier sensing circuit 74D is connected to a control terminal of the light emitter 74C.

The light receiver 74A receives an optical signal from the host repeater 76, and converts the optical signal into a corresponding electric signal. The light receiver 74A outputs the electric signal to the frequency converter 74B and the carrier sensing circuit 74D. The output signal of the light receiver 74A has the predetermined carrier frequency F3 which differs from the carrier frequencies F1 and F2. The carrier sensing circuit 74D detects whether or not the amplitude of the output signal of the light receiver 74A is smaller than a predetermined reference level, that is, whether or not the strength of the optical signal received by the light receiver 74A is smaller than a predetermined reference strength. The carrier sensing circuit 74D outputs a signal representative of the result of the detection (the result of the comparison) to the light emitter 74C. The frequency converter 74B subjects the output signal of the light receiver 74A to frequency conversion. During the frequency conversion, the carrier frequency F3 of the output signal of the light receiver 74A is changed to a predetermined carrier frequency F4. The carrier frequency F4 is different from the carrier frequencies F1, F2, and F3. Thus, the frequency converter 74B outputs a signal having the carrier frequency F4. The output signal from the frequency converter 74B is fed to the light emitter 74C. The light emitter 74C is enabled and disabled by the output signal from the carrier sensing circuit 74D. When the carrier sensing circuit 74D detects that the strength of the optical signal received by the light receiver 74A is equal to or greater than the predetermined reference strength, the light emitter 74C is enabled in response to the output signal from the carrier sensing circuit 74D so that the light emitter 74C converts the output signal of the frequency converter 74B into a corresponding optical signal and emits the optical signal toward terminal devices T.

Figure 11:
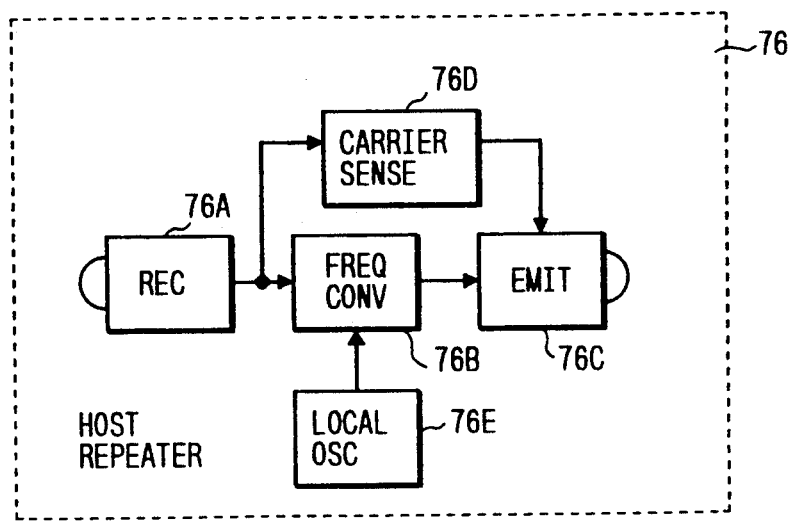
FIG. 11 is a block diagram of a host repeater in the repeater system of FIG. 9.

As shown in FIG. 11, the host repeater 76 includes a light receiver 76A, a frequency converter 76B, a light emitter 76C, a carrier sensing circuit 76D, and a local oscillator 76E. The output terminal of the light receiver 76A is connected to the input terminal of the carrier sensing circuit 76D. The output terminal of the light receiver 76A is also connected to a first input terminal of the frequency converter 76B. The output terminal of the local oscillator 76E is connected to a second input terminal of the frequency converter 76B. The output terminal of the frequency converter 76B is connected to the input terminal of the light emitter 76C. The output terminal of the carrier sensing circuit 76D is connected to a control terminal of the light emitter 76C.

The light receiver 76A receives an optical signal from the first section 72 of an end repeater 70, and converts the optical signal into a corresponding electric signal. The light receiver 76A outputs the electric signal to the frequency converter 76B and the carrier sensing circuit 76D. The output signal of the light receiver 76A has the predetermined carrier frequency F2. The carrier sensing circuit 76D detects whether or not the amplitude of the output signal of the light receiver 76A is smaller than a predetermined reference level, that is, whether or not the strength of the optical signal received by the light receiver 76A is smaller than a predetermined reference strength. The carrier sensing circuit 76D outputs a signal representative of the result of the detection (the result of the comparison) to the light emitter 76C. The frequency converter 76B mixes the output signal of the light receiver 76A and the output signal of the local oscillator 76E, subjecting the output signal of the light receiver 74A to frequency conversion. During the frequency conversion, the carrier frequency F2 of the output signal of the light receiver 76A is changed to the predetermined carrier frequency F3. Thus, the frequency converter 76B outputs a signal having the carrier frequency F3. The output signal from the frequency converter 76B is fed to the light emitter 76C. The light emitter 76C is enabled and disabled by the output signal from the carrier sensing circuit 76D. When the carrier sensing circuit 76D detects that the strength of the optical signal received by the light receiver 76A is equal to or greater than the predetermined reference strength, the light emitter 76C is enabled in response to the output signal from the carrier sensing circuit 76D so that the light emitter 76C converts the output signal of the frequency converter 76B into a corresponding optical signal and emits the optical signal toward the end repeaters 70.

As shown in FIG. 9, the host repeater 76 and the end repeaters 70 are located at a ceiling. It is preferable that the end repeaters 70 surround the host repeater 76. An example of the communication between two of the terminal devices T is executed as follows. A light emitter 24 of a first terminal device T outputs an optical signal of the on/off frequency F1 toward a first end repeater 70 close thereto. The optical signal outputted from the first terminal device T is received by the first section 72 of the first end repeater 70, and is converted into a corresponding optical signal of the on/off frequency F2 by the first section 72 of the first end repeater 70. The first section 72 of the first end repeater 70 emits the optical signal toward the host repeater 76. The optical signal outputted from the first section 72 of the first end repeater 70 is received by the host repeater 76, and is converted into a corresponding optical signal of the on/off frequency F3 by the host repeater 76. The host repeater 76 emits the optical signal toward the end repeaters 70. The optical signal outputted from the host repeater 76 is received by the second sections 74 of the end repeaters 70, and is converted into corresponding optical signals of the on/off frequency F4 by the second sections 74 of the end repeaters 70. The second sections 74 of the end repeaters 70 output the optical signals toward the terminal devices T. A light receiver 26 of a second terminal device T receives the optical signal from the second section 74 of a second end repeater 70 close thereto. In this way, the communication between the first and second terminal devices T is established.

DESCRIPTION OF THE FOURTH PREFERRED EMBODIMENT

Figure 12:
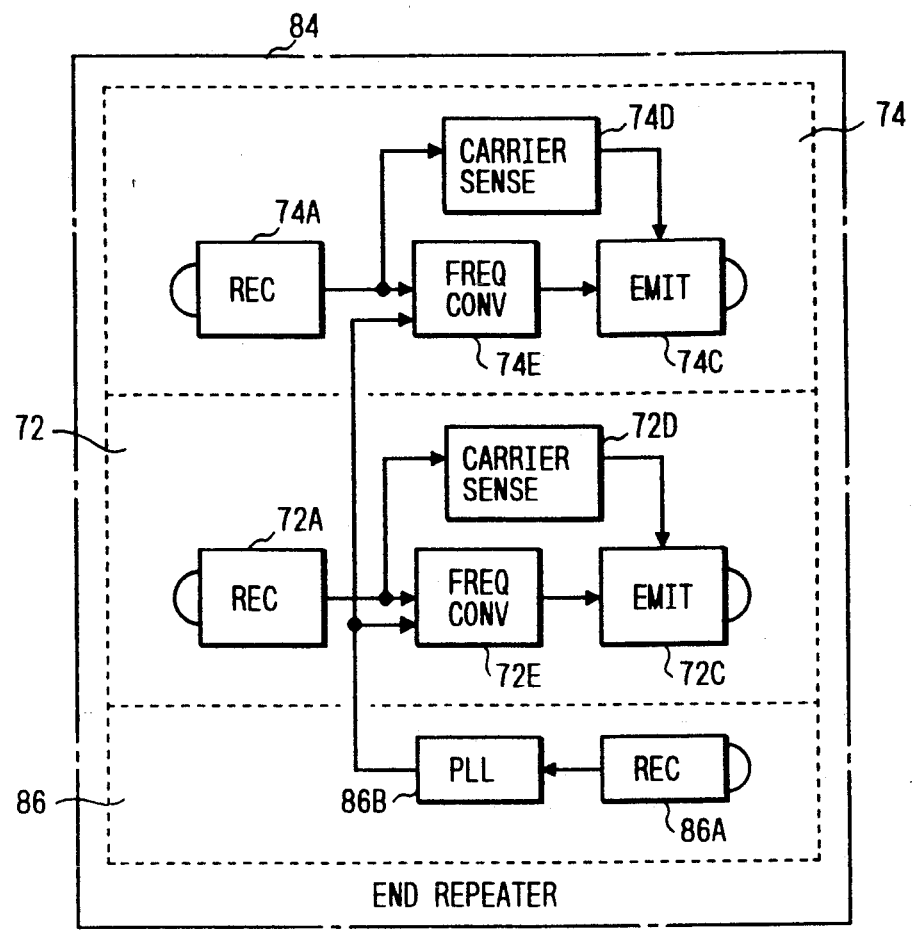
FIG. 12 is a block diagram of an end repeater in a repeater system according to a fourth embodiment of this invention.
Figure 13:
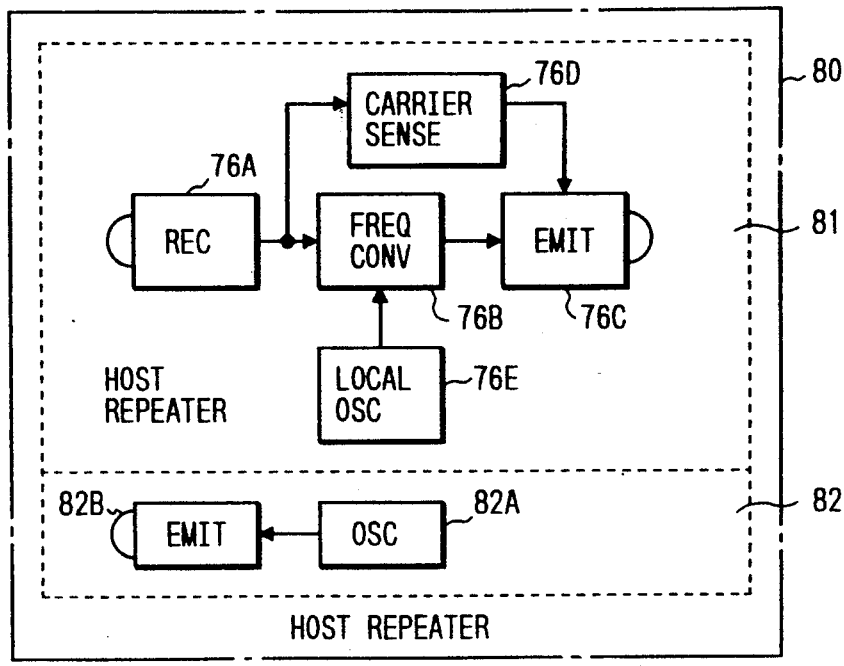
FIG. 13 is a block diagram of a host repeater in the repeater system according to the fourth embodiment of this invention.

FIGS. 12 and 13 relate to a fourth embodiment of this invention which is similar to the embodiment of FIGS. 9-11 except for design changes described hereinafter.

As shown in FIG. 12, each end repeater 84 is divided into a first main section 72, a second main section 74, and a local oscillator 86. The first main section 72 of the end repeater 84 includes a light receiver 72A, a frequency converter 72E, a light emitter 72C, and a carrier sensing circuit 72D. The output terminal of the light receiver 72A is connected to a first input terminal of the frequency converter 72E. A second input terminal of the frequency converter 72E is connected to the output terminal of the local oscillator 86. The output terminal of the light emitter 72A is also connected to the input terminal of the carrier sensing circuit 72D. The output terminal of the frequency converter 72E is connected to the input terminal of the light emitter 72C. The output terminal of the carrier sensing circuit 72D is connected to a control terminal of the light emitter 72C.

The light receiver 72A receives an optical signal from a terminal device T, and converts the optical signal into a corresponding electric signal. The light receiver 72A outputs the electric signal to the frequency converter 72E and the carrier sensing circuit 72D. The output signal of the light receiver 72A has the predetermined carrier frequency F1. The carrier sensing circuit 72D detects whether or not the amplitude of the output signal of the light receiver 72A is smaller than the predetermined reference level, that is, whether or not the strength of the optical signal received by the light receiver 72A is smaller than the predetermined reference strength. The carrier sensing circuit 72D outputs a signal representative of the result of the detection (the result of the comparison) to the light emitter 72C. The frequency converter 72E mixes the output signal of the light receiver 72A and the output signal of the local oscillator 86, subjecting the output signal of the light receiver 72A to frequency conversion. The output signal of the local oscillator 86 has a predetermined frequency F0. During the frequency conversion, the carrier frequency F1 of the output signal of the light receiver 72A is changed to the predetermined carrier frequency F2. The carrier frequency F2 is equal to the sum of the carrier frequency F1 and the local oscillator signal frequency F0. Thus, the frequency converter 72E outputs a signal having the carrier frequency F2. The output signal from the frequency converter 72E is fed to the light emitter 72C. The light emitter 72C is enabled and disabled by the output signal from the carrier sensing circuit 72D. When the carrier sensing circuit 72D detects that the strength of the optical signal received by the light receiver 72A is equal to or greater than the predetermined reference strength, the light emitter 72C is enabled in response to the output signal from the carrier sensing circuit 72D so that the light emitter 72C converts the output signal of the frequency converter 72E into a corresponding optical signal and emits the optical signal toward a host repeater 80.

As shown in FIG. 12, the second main section 74 of the end repeater 84 includes a light receiver 74A, a frequency converter 74E, a light emitter 74C, and a carrier sensing circuit 74D. The output terminal of the light receiver 74A is connected to a first input terminal of the frequency converter 74E. A second input terminal of the frequency converter 74E is connected to the output terminal of the local oscillator 86. The output terminal of the light receiver 74A is also connected to the input terminal of the carrier sensing circuit 74D. The output terminal of the frequency converter 74E is connected to the input terminal of the light emitter 74C. The output terminal of the carrier sensing circuit 74D is connected to a control terminal of the light emitter 74C.

The light receiver 74A receives an optical signal from the host repeater 76, and converts the optical signal into a corresponding electric signal. The light receiver 74A outputs the electric signal to the frequency converter 74E and the carrier sensing circuit 74D. The output signal of the light receiver 74A has the predetermined carrier frequency F3 which differs from the carrier frequencies F1 and F2. The carrier sensing circuit 74D detects whether or not the amplitude of the output signal of the light receiver 74A is smaller than a predetermined reference level, that is, whether or not the strength of the optical signal received by the light receiver 74A is smaller than a predetermined reference strength. The carrier sensing circuit 74D outputs a signal representative of the result of the detection (the result of the comparison) to the light emitter 74C. The frequency converter 74E mixes the output signal of the light receiver 74A and the output signal of the local oscillator 86, subjecting the output signal of the light receiver 74A to frequency conversion. During the frequency conversion, the carrier frequency F3 of the output signal of the light receiver 74A is changed to a predetermined carrier frequency F4. The carrier frequency F4 is equal to the sum of the carrier frequency F3 and the local oscillator signal frequency F0. Thus, the frequency converter 74E outputs a signal having the carrier frequency F4. The output signal from the frequency converter 74E is fed to the light emitter 74C. The light emitter 74C is enabled and disabled by the output signal from the carrier sensing circuit 74D. When the carrier sensing circuit 74D detects that the strength of the optical signal received by the light receiver 74A is equal to or greater than the predetermined reference strength, the light emitter 74C is enabled in response to the output signal from the carrier sensing circuit 74D so that the light emitter 74C converts the output signal of the frequency converter 74E into a corresponding optical signal and emits the optical signal toward terminal devices T.

As shown in FIG. 12, the local oscillator 86 includes a light receiver 86A and a PLL circuit 86B. The light receiver 86A receives an optical signal of the on/off frequency F0 from the host repeater 80, and converts the optical signal into a corresponding electric signal. The light receiver 86A outputs the electric signal to the PLL circuit 86B. The PLL circuit 86B generates the local oscillator signal from the output signal of the light receiver 86A. The PLL circuit 86B outputs the local oscillator signal to the frequency converters 72E and 74E.

As shown in FIG. 13, the host repeater 80 is divided into a main section 81 and a local oscillator signal transmitter 82. The main section 81 of the host repeater 80 includes a light receiver 76A, a frequency converter 76B, a light emitter 76C, a carrier sensing circuit 76D, and a local oscillator 76E. The output terminal of the light receiver 76A is connected to the input terminal of the carrier sensing circuit 76D. The output terminal of the light receiver 76A is also connected to a first input terminal of the frequency converter 76B. The output terminal of the local oscillator 76E is connected to a second input terminal of the frequency converter 76B. The output terminal of the frequency converter 76B is connected to the input terminal of the light emitter 76C. The output terminal of the carrier sensing circuit 76D is connected to a control terminal of the light emitter 76C.

The light receiver 76A receives an optical signal from the first main section 72 of an end repeater 84, and converts the optical signal into a corresponding electric signal. The light receiver 76A outputs the electric signal to the frequency converter 76B and the carrier sensing circuit 76D. The output signal of the light receiver 76A has the predetermined carrier frequency F2. The carrier sensing circuit 76D detects whether or not the amplitude of the output signal of the light receiver 76A is smaller than a predetermined reference level, that is, whether or not the strength of the optical signal received by the light receiver 76A is smaller than a predetermined reference strength. The carrier sensing circuit 76D outputs a signal representative of the result of the detection (the result of the comparison) to the light emitter 76C. The local oscillator 76E outputs a local oscillator signal of a predetermined frequency FL to the frequency converter 76B. The frequency converter 76B mixes the output signal of the light receiver 76A and the output signal of the local oscillator 76E, subjecting the output signal of the light receiver 74A to frequency conversion. During the frequency conversion, the carrier frequency F2 of the output signal of the light receiver 76A is changed to the predetermined carrier frequency F3. The carrier frequency F3 is equal to the sum of the carrier frequency F2 and the local oscillator signal frequency FL. Thus, the frequency converter 76B outputs a signal having the carrier frequency F3. The output signal from the frequency converter 76B is fed to the light emitter 76C. The light emitter 76C is enabled and disabled by the output signal from the carrier sensing circuit 76D. When the carrier sensing circuit 76D detects that the strength of the optical signal received by the light receiver 76A is equal to or greater than the predetermined reference strength, the light emitter 76C is enabled in response to the output signal from the carrier sensing circuit 76D so that the light emitter 76C converts the output signal of the frequency converter 76B into a corresponding optical signal and emits the optical signal toward the end repeaters 84.

As shown in FIG. 13, the local oscillator signal transmitter 82 includes an oscillator 82A and a light emitter 82B. The oscillator 82A outputs a signal of the predetermined frequency F0 to the light emitter 82B. The light emitter 82B converts the output signal of the oscillator 82A into a corresponding optical signal of the on/off frequency F0, and emits the optical signal toward the end repeaters 84. It is preferable that the frequencies F0, F1, F2, F3, and F4 have the relation as $F0 < F1 < F2 < F3 < F4$.

DESCRIPTION OF THE FIFTH PREFERRED EMBODIMENT

Figure 14:
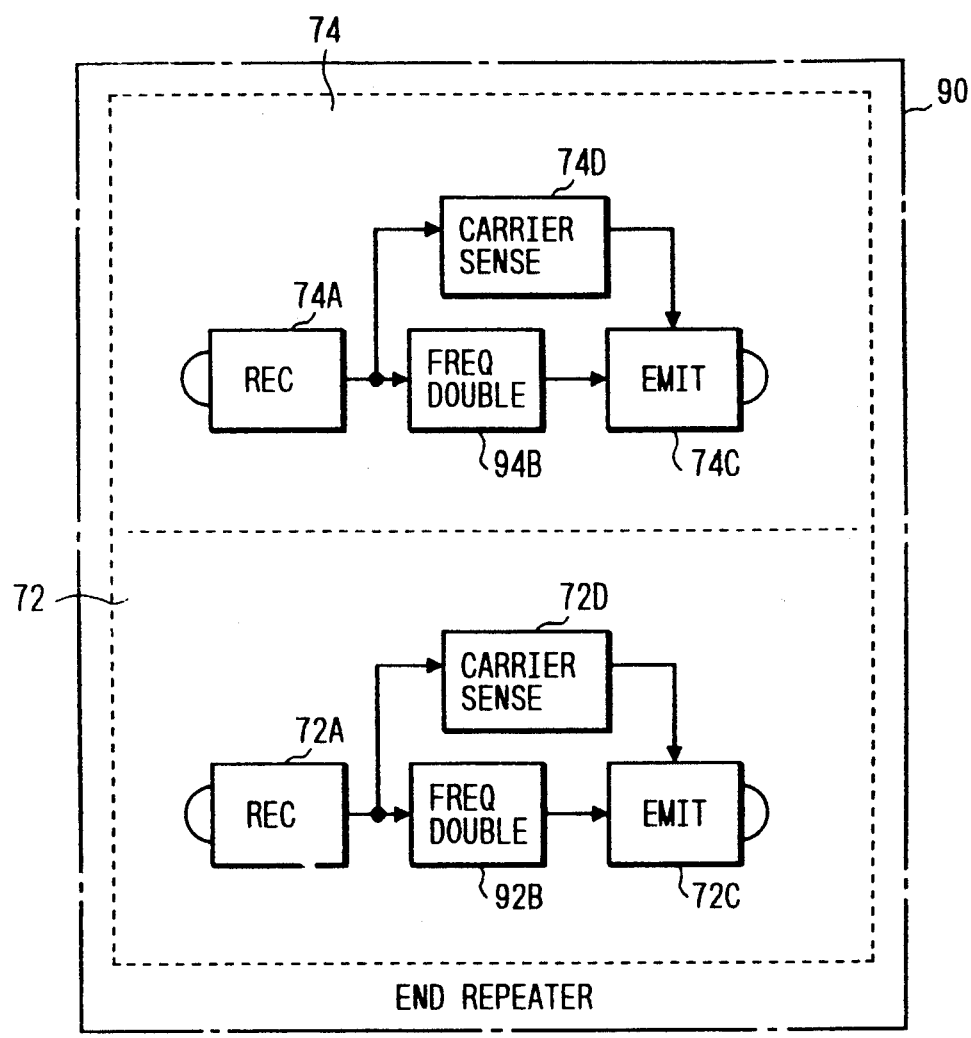
FIG. 14 is a block diagram of an end repeater in a repeater system according to a fifth embodiment of this invention.

FIG. 14 relates to a fifth embodiment of this invention which is similar to the embodiment of FIGS. 9–11 except for design changes described hereinafter. As shown in FIG. 14, in the fifth embodiment, first and second section sections 72 and 74 of each end repeater 90 include frequency doubles 92B and 94B in place of the frequency converters 72B and 74B (see FIG. 10) respectively. In the fifth embodiment, it is preferable that predetermined frequencies F1, F2, F3, and F4 have the relation as $F1 < F3 < F2 < F4$. In addition, the predetermined frequency F3 is equal to the predetermined frequency F2 minus the frequency FL of a local oscillator signal used in a host repeater.

What is claimed is:

1. A repeater for data communication between terminal devices which uses optical signals, the repeater comprising:
    a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal; and
    a second section including fourth means for receiving a third optical signal and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device.

2. The repeater of claim 1, further comprising means for inhibiting a transmission of the second optical signal from the first section when the second section receives the third optical signal.

3. The repeater of claim 1, further comprising seventh means for storing packet data received by the first section, eighth means for comparing the packet data stored in the seventh means and packet data received by the second section, and ninth means responsive to a result of the comparing by the eighth means for erasing the packet data from the seventh means when the packet data stored in the seventh means is equal to the packet data received by the second section.

4. A repeater system for data communication between terminal devices which uses an optical signal, the repeater system comprising repeaters each including:
    a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal; and
    a second section including fourth means for receiving a third optical signal and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device.

5. A repeater system for data communication between terminal devices which uses an optical signal, the repeater system comprising an end repeater and a host repeater, wherein the end repeater includes:
    a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal to the host repeater; and
    a second section including fourth means for receiving a third optical signal from the host repeater and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device; and
    wherein the host repeater includes:
    seventh means for receiving a second optical signal from the end repeater and for converting the second optical signal into a fifth electric signal, eighth means for frequency-converting the fifth electric signal to a sixth electric signal, and ninth means for converting the sixth electric signal into a third optical signal and for transmitting the third optical signal to the end repeater.

6. The repeater system of claim 5, wherein the host repeater further includes tenth means for transmitting a local oscillator optical signal to the end repeater, and wherein the end repeater further includes eleventh means for receiving the local oscillator optical signal from the host repeater and for converting the local oscillator optical signal into an electric local oscillator signal, and twelfth means for feeding the electric local oscillator signal to the second and fifth means and for using the electric local oscillator signal in the frequency-converting by the second and fifth means.

7. The repeater system of claim 5, wherein the second means includes a frequency doubler, and the fifth means includes a frequency doubler.

8. A repeater system for packet data communication between terminal devices which uses an optical signal, the repeater system comprising a host repeater and a plurality of end repeaters, wherein each of the end repeaters includes:
    a first section including first means for receiving a first optical signal transmitted from a terminal device and for converting the first optical signal into a first electric signal, second means for frequency-converting the first electric signal to a second electric signal, and third means for converting the second electric signal into a second optical signal and for transmitting the second optical signal to the host repeater; and a second section including fourth means for receiving a third optical signal from the host repeater and for converting the third optical signal into a third electric signal, fifth means for frequency-converting the third electric signal to a fourth electric signal, and sixth means for converting the fourth electric signal into a fourth optical signal and for transmitting the fourth optical signal to a terminal device; and wherein the host repeater includes:

seventh means for receiving a fifth optical signal from the end repeater and for converting the fifth optical signal into a fifth electric signal, eighth means for frequency-converting the fifth electric signal to a sixth electric signal, and ninth means for converting the sixth electric signal into a sixth optical signal and for transmitting the sixth optical signal to the end repeater.

9. A repeater for data communication between terminal devices which uses optical signals, the repeater comprising:

a first section including first means for receiving a first optical signal transmitted from a terminal device and for converting the first optical signal into a first electric signal having a first frequency, second means for frequency-converting the first electric signal to a second electric signal having a second frequency different from the first frequency, and third means for converting the second electric signal into a second optical signal and for transmitting the second optical signal;

a second section including fourth means for receiving a third optical signal and for converting the third optical signal into a third electric signal having the second frequency, fifth means for frequency-converting the third electric signal to a fourth electric signal having a third frequency different from both the first and second frequencies, and sixth means for converting the fourth electric signal into a fourth optical signal and for transmitting the fourth optical signal to a terminal device; and means for inhibiting a transmission of the second optical signal from the first section when the second section receives the third optical signal.

10. A repeater system as recited in claim 9, wherein said sixth means comprises means for transmitting the fourth optical signal intermittently with an on/off frequency equal to said third frequency.

11. A repeater system for data communication between terminal devices which uses an optical signal, the repeater system comprising repeaters each including:

a first section including first means for receiving a first optical signal transmitted from a terminal device and for converting the first optical signal into a first electric signal having a first frequency, second means for frequency-converting the first electric signal to a second electric signal having a second frequency different from the first frequency, and third means for converting the second electric signal into a second optical signal and for transmitting the second optical signal;

a second section including fourth means for receiving a third optical signal and for converting the third optical signal into a third electric signal having the second frequency, fifth means for frequency-converting the third electric signal to a fourth electric signal having a third frequency different from both the first and second frequencies, and sixth means for converting the fourth electric signal into a fourth optical signal and for transmitting the fourth optical signal to a terminal device; and means for inhibiting a transmission of the second optical signal from the first section when the second section receives the third optical signal.

12. A repeater system as recited in claim 11, wherein said sixth means transmits the fourth optical signal intermittently with an on/off frequency equal to said third frequency.

13. A repeater system for data communication between terminal devices which uses an optical signal, the repeater system comprising an end repeater and a host repeater, wherein the end repeater includes:

a first section including first means for receiving a first optical signal transmitted from a terminal device and for converting the first optical signal into a first electric signal having a first frequency, second means for frequency-converting the first electric signal to a second electric signal having a second frequency different from the first frequency, and third means for converting the second electric signal into a second optical signal and for transmitting the second optical signal to the host repeater; and a second section including fourth means for receiving a third optical signal from the host repeater and for converting the third optical signal into a third electric signal having a third frequency different from both the first and second frequencies, fifth means for frequency-converting the third electric signal to a fourth electric signal having a fourth frequency different from the first, second, and third frequencies, and sixth means for converting the fourth electric signal into a fourth optical signal and for transmitting the fourth optical signal to a terminal device; and wherein the host repeater includes:

seventh means for receiving a fifth optical signal from the end repeater and for converting the fifth optical signal into a fifth electric signal having the second frequency, eighth means for frequency-converting the fifth electric signal to a sixth electric signal having the third frequency, and ninth means for converting the sixth electric signal into a sixth optical signal and for transmitting the sixth optical signal to the end repeater.

14. A repeater system as recited in claim 13, wherein said sixth means transmits the fourth optical signal intermittently with an on/off frequency equal to said third frequency.

15. A repeater system for packet data communication between terminal devices which uses an optical signal, the repeater system comprising a host repeater and a plurality of end repeaters, wherein each of the end repeaters includes:

a first section including first means for receiving a first optical signal transmitted from a terminal device and for converting the first optical signal into a first electric signal having a first frequency, second means for frequency-converting the first electric signal to a second electric signal having a second frequency different from the first frequency, and third means for converting the second electric signal into a second optical signal and for transmitting the second optical signal to the host repeater; and a second section including fourth means for receiving a third optical signal from the host repeater and for converting the third optical signal into a third electric signal having a third frequency different from both the first and second frequencies, fifth means for frequency-converting the third electric signal to a fourth electric signal having a fourth frequency different from the first, second, and third frequencies, and sixth means for converting the fourth electric signal into a fourth optical signal and for transmitting the fourth optical signal to a terminal device; and wherein the host repeater includes:

seventh means for receiving a fifth optical signal from the end repeater and for converting the fifth optical signal into a fifth electric signal having the second frequency, eighth means for frequency-converting the fifth electric signal to a sixth electric signal having the third frequency, and ninth means for converting the sixth electric signal into a sixth optical signal and for transmitting the sixth optical signal to the end repeater.

16. A repeater system as recited in claim 15, wherein said sixth means transmits the fourth optical signal intermittently with an on/off frequency equal to said third frequency.

* * * * *